(12) United States Patent
Ono et al.

(10) Patent No.: US 6,943,911 B1
(45) Date of Patent: Sep. 13, 2005

(54) DRIVING CONTROL APPARATUS AND DRIVING CONTROL METHOD

(75) Inventors: Shunichi Ono, Shizuoka-ken (JP); Jun Takamura, Mishima (JP); Noboru Nitta, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/569,263

(22) Filed: May 11, 2000

(30) Foreign Application Priority Data

May 20, 1999 (JP) .................................. 11-140400

(51) Int. Cl.$^7$ ............................................. G06F 15/00
(52) U.S. Cl. ..................... 358/1.16; 358/1.17; 358/1.9; 358/1.1
(58) Field of Search ............................. 358/1.16, 1.17, 358/443, 444, 464, 1.9, 1.1, 404; 710/129, 710/2, 29; 382/325; 375/340, 355, 371

(56) References Cited

U.S. PATENT DOCUMENTS 6,563,888 B1 * 5/2003 Toriyama .................... 375/340
6,584,527 B2 * 6/2003 Verinsky et al. ............ 710/305

FOREIGN PATENT DOCUMENTS

JP         4-264871         9/1992

* cited by examiner

*Primary Examiner*—Twyler Lamb
(74) *Attorney, Agent, or Firm*—Frishauf, Holtz, Goodman & Chick, P.C.

(57) ABSTRACT

A driving control apparatus incorporating a forming circuit for receiving serial data including start bit data and driving control data, detecting the start bit data from the serial data and forming a control signal in accordance with the detected start bit data, a storing portion for storing the driving control data in a storing region in accordance with the control signal formed by the forming circuit, and a generating circuit for generating a driving signal for driving a subject which must be driven in accordance with the driving control data stored in the storing portion and the control signal formed by the forming circuit. Since the start bit data provides start timing, a multiplicity of control signals are not required.

34 Claims, 13 Drawing Sheets

DRIVING CONTROL APPARATUS AND DRIVING CONTROL METHOD

CROSS-REFERENCE TO RELATED APPLICATIONS

This application is based upon and claims the benefit of priority from the prior Japanese Patent Application No. 11-140400, filed May 20, 1999, the entire contents of which are incorporated herein by reference.

BACKGROUND OF THE INVENTION

The present invention relates to a driving control method for driving a medium, such as a head driving apparatus for a thermal printer or an ink jet printer, a CCD driver, a motor driver or a liquid crystal driver, which is operated in accordance with data or a driving signal, and a driving control apparatus.

As a driving control apparatus of the foregoing type, a head driving apparatus for an ink jet printer is known. In general, a head driving apparatus (not shown) of the foregoing type incorporates a shift register, which constitutes a buffer for two lines, and a latch circuit. Moreover, the head driving apparatus incorporates an ink jet head formed by disposing ink chambers of the ink jet head, an AND gate for outputting an energizing signal in accordance with an output of the latch circuit and an energizing enable and an amplifier which amplifies an output from the AND gate to output a driving waveform from each output pin.

In order to realize an original operation, serial data, a data transmission enable and a system clock, which are supplied to the shift register, must be input to the head driving apparatus of the foregoing type. A latch signal must be input to the latch circuit. An energizing enable must be input to the AND circuit in order to provide operation timing. Thus, a driving waveform for driving an ink chamber of the ink jet head is supplied from the AND circuit through the amplifier. Note that a data transmission clock may be employed as a substitute for the data transmission enable.

As a head driving apparatus for performing multi-drop gray-level driving, for example, 8-bit gray-level energizing signal for expressing the gray-level is supplied to a selector circuit for specifying the gray-level level.

In either case, the conventional head driving apparatus has a problem in that a multiplicity of control signals to drive the ink chambers of the ink jet head are required as well as serial data, the clock signal and the reset signal.

As described above, the number of signal lines for driving the head is increased as the head driving apparatuses which must be connected is increased. Therefore, an excessively large number of cables and connector pins is required. That is, the cables and connector pins are increased as the signal lines required to drive the head is increased. Hence it follows that noises are increased. Thus, there arises a problem in that the dependability, such as contact reliability, deteriorates and the cost is enlarged.

BRIEF SUMMARY OF THE INVENTION

An object of the perspective view is to provide a driving control apparatus which is capable of driving a head with a least possible signal lines, adjusting the driving timing of the head and enabling a multi-connection with the least possible signals and a driving control method.

According to the present invention, there is provided a driving control apparatus comprising: forming means for receiving serial data including start bit data and driving control data, and detecting the start bit data from the serial data so as to form control signals in accordance with the detected start bit data; storing means for storing the driving control data in a storage region in accordance with the control signal formed by the forming means; and generating means for generating a driving signal for driving a subject which must be driven in accordance with the driving control data stored by the storing means and the control signal formed by the forming means.

A first embodiment of the present invention having the above-mentioned structure enables a driving control apparatus for driving the head of, for example, an ink jet printer to add start bit data for specifying the start of the operation as well as driving control data, that is, print data. Thus, a necessity for a multiplicity of enable signals can be eliminated as distinct from a conventional apparatus. The timing of start bit data is used to form a variety of control signals required to generate a driving signal in accordance with set data and print data. Thus, a driving control apparatus can be provided which controls driving of the head of the ink jet printer with a very small number of control signals, for example, three signals which consist of serial data, clock signal and the reset signal. As a result, the cables and connectors in the vicinity of the head driving apparatus can be scaled down. It leads to a fact that the cost can be reduced.

The aspects of second to sixth embodiments of the present invention permit a driving control apparatus to be provided which is arranged to reduce the number of control signals for use in the vicinity of the head driving apparatus to scale-down the cables and connectors so as to reduce the cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
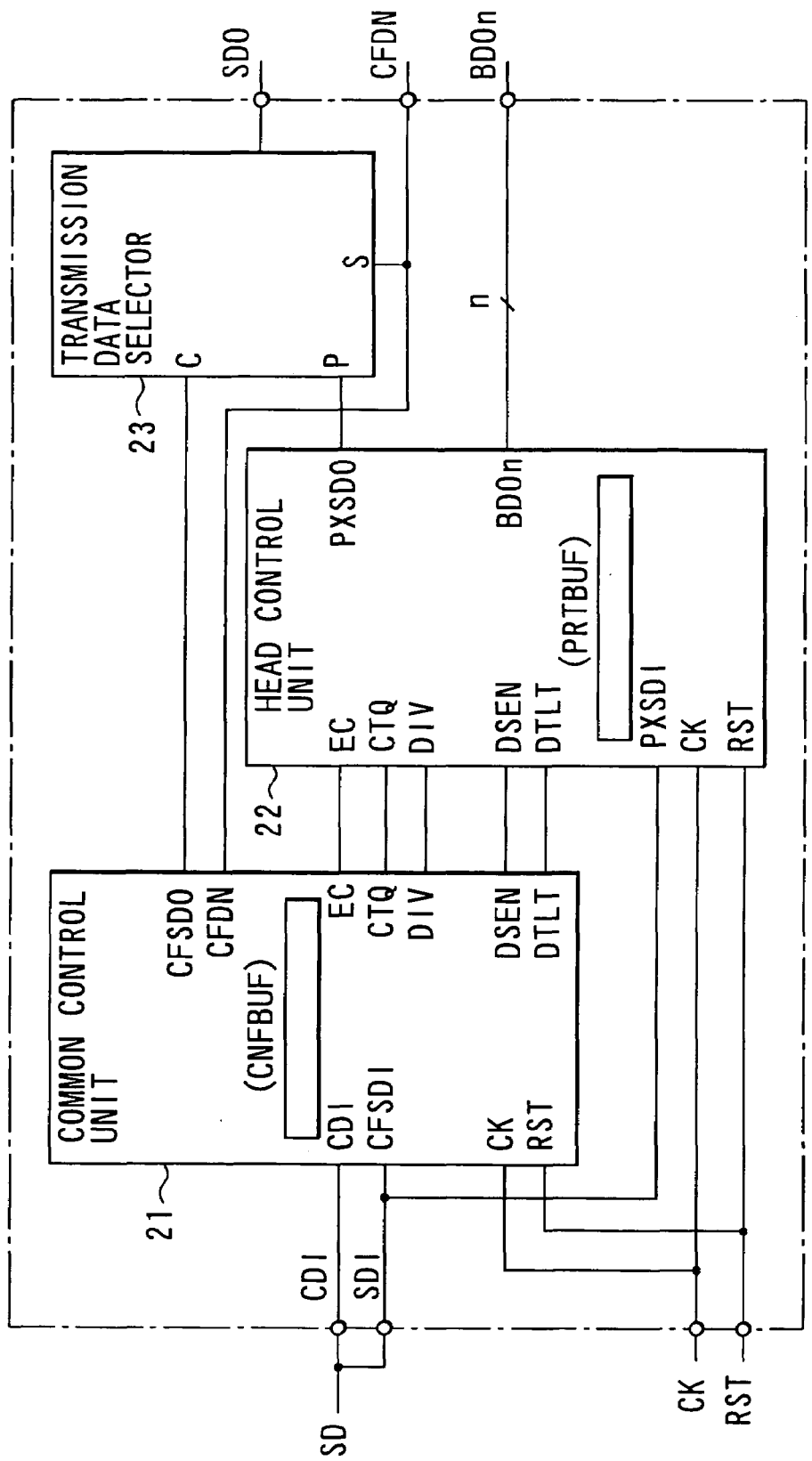
FIG. 1 is a circuit diagram of a head driving apparatus according to a first embodiment of the present invention.

First to sixth embodiments of the present invention will now be described with reference to the drawings.

First Embodiment

According to the first embodiment, there is provided a driving control apparatus and a driving control method. The driving control apparatus is structured to add start bit information serving as startup information to serial data. Then, the driving control apparatus detects start bit information to form, therein, required signals for controlling data transmission, latching and driving. In accordance with formed control signals, the driving control apparatus forms driving signals so as to control driving of a medium which must be controlled.

Thus, the driving control apparatus and the driving control method can be provided which do not require control signals, such as a variety of enable signals, required for the conventional driving apparatus. Moreover, driving timing of the medium which must be driven can be adjusted.

Moreover, the required controls can furthermore be decreased by adding control information, such as information about the number of transmissions to the trailing end of the start bit. When set mode checking data or the like is provided for the trailing end of set data to realize reliable switching between the set mode and the printing mode. Thus, the required control signals can furthermore be reduced as follows. Note that the foregoing structures are not essential portions for the first embodiment. The foregoing structures are described in the second and third embodiments as independent structures.

Referring to the drawings, the first embodiment will now be described in which the present invention is applied to a head driving apparatus of an ink jet printer.

The head driving apparatus according to the first embodiment controls the gray-level of n ink jet heads each having an ink chamber. The head driving apparatus has a setting mode and a printing mode which is a driving control mode. In the setting mode, setting of a control unit is performed, while a printing operation is performed in the printing mode.

FIG. 1 is a circuit diagram showing the structure of the head driving apparatus according to the first embodiment. The head driving apparatus incorporates a common control unit 21 for forming control signals for controlling data transmission, latching and energization. Moreover, the head driving apparatus incorporates a head control unit 22 serving as a driving means for forming a gray-level head driving signal for driving the ink jet head (not shown) in response to the control signal formed by the common control unit 21 to produce an output through output pins DOn (n=1 to 162). In addition, the head driving apparatus incorporates a transmission data selector 23 which is required when cascade connection is established.

The common control unit 21 outputs a variety of control signals to the head control unit 22 in the printing mode to control the driving of the head control unit 22. The common control unit 21 incorporates a set-data buffer (CNFBUF) to which set data to be described later is input. In the setting mode, setting is performed with respect to an internal setting register (not shown), which will be described later, through the set-data buffer (CNFBUF). Thus, the common control unit 21 is operated. In addition to the control of the printing operation, the common control unit 21 controls a print-data buffer (PRTBUF) which is a driving control data buffer arranged to input print data and provided for the head control unit 22 such that transmission of print data and latching are controlled. Note that print-data buffer (PRTBUF) is also a data input means.

Outputs of set-data buffer (CNFBUF) and print-data buffer (PRTBUF) are switched by the transmission data selector 23 so as to be output.

Therefore, when a plurality of the head driving apparatuses according to the first embodiment is cascade-connected, the cascade-connection of each buffer is permitted in each of the setting mode and the printing mode. Thus, the number of signal lines for transmitting set data and print data can be reduced.

The transmission data selector 23 is required only when a plurality of the head driving apparatuses are connected. When one head driving apparatus is used, the transmission data selector 23 is not required.

The head driving apparatus according to the first embodiment incorporates three inputs from outside which include serial data (SD), system clock (CK) and system reset (RST); two outputs to the outside which include serial data output (SDO) which is a data output terminal and setting completion signal (CFDN); and n gray-level head driving signal outputs (DOn). Note that serial data (SD) is supplied to both of the start-bit detecting terminal (CDI) and the data input terminal (SDI). The setting completion signal (CFDN) is a signal for monitoring the setting mode and the printing mode.

Figure 2:
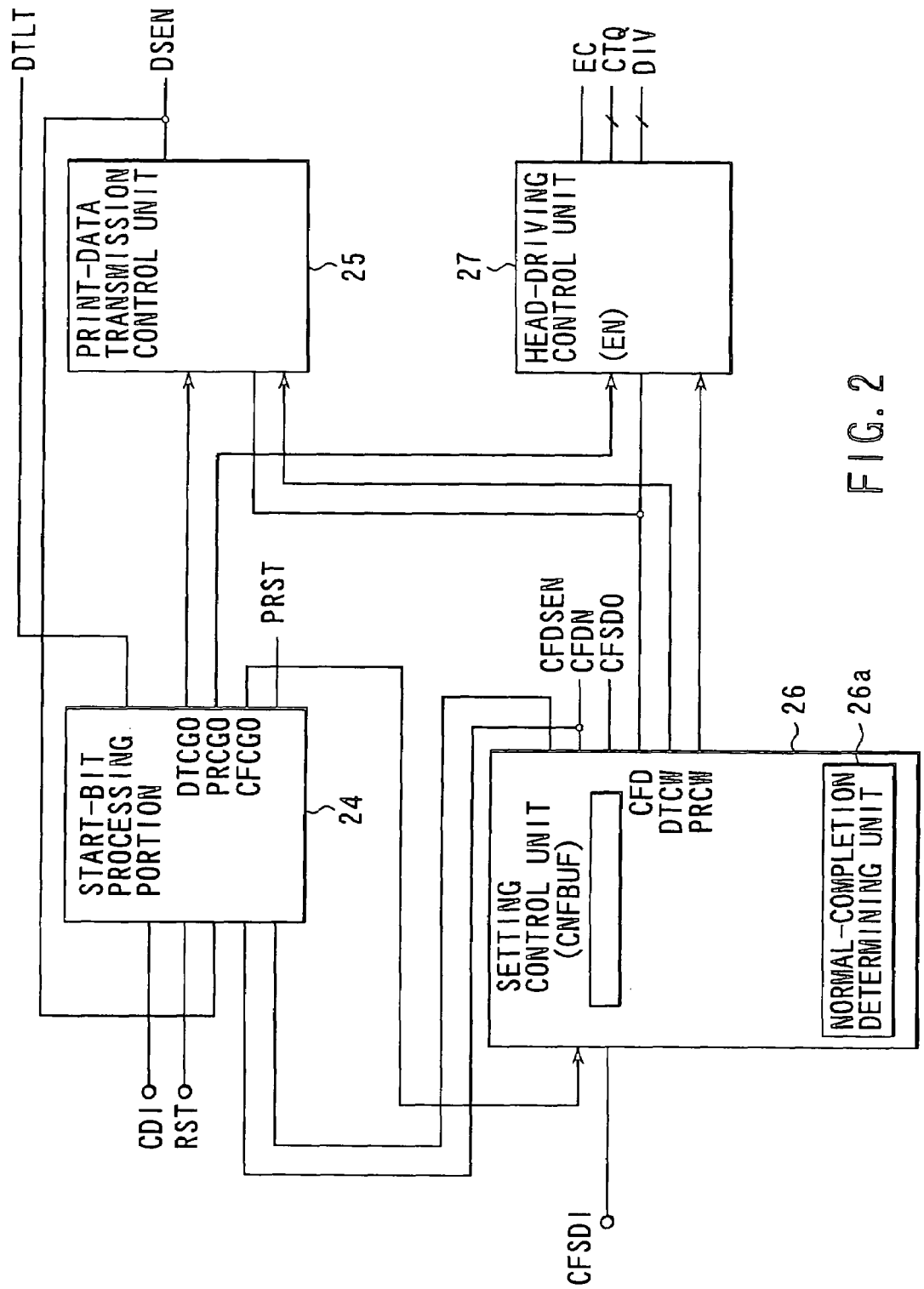
FIG. 2 is a circuit diagram of a common control unit shown in FIG. 1.

The structure of the circuit of the common control unit 21 will now be described with reference to FIG. 2.

The common control unit 21 incorporates start-bit detection means for detecting the start bit which is startup information of serial data (SD) to be described later; a start-bit processing portion 24 serving as a mode determining means; a print-data transmission control unit 25 for forming a data transmission enable; a head-driving control unit 27 for controlling the head control unit 22; and a setting control unit 26 for performing a predetermined setting through the set-data buffer (CNFBUF). In accordance with output from the common control unit 21, the head control unit 22 is operated.

Figure 10:
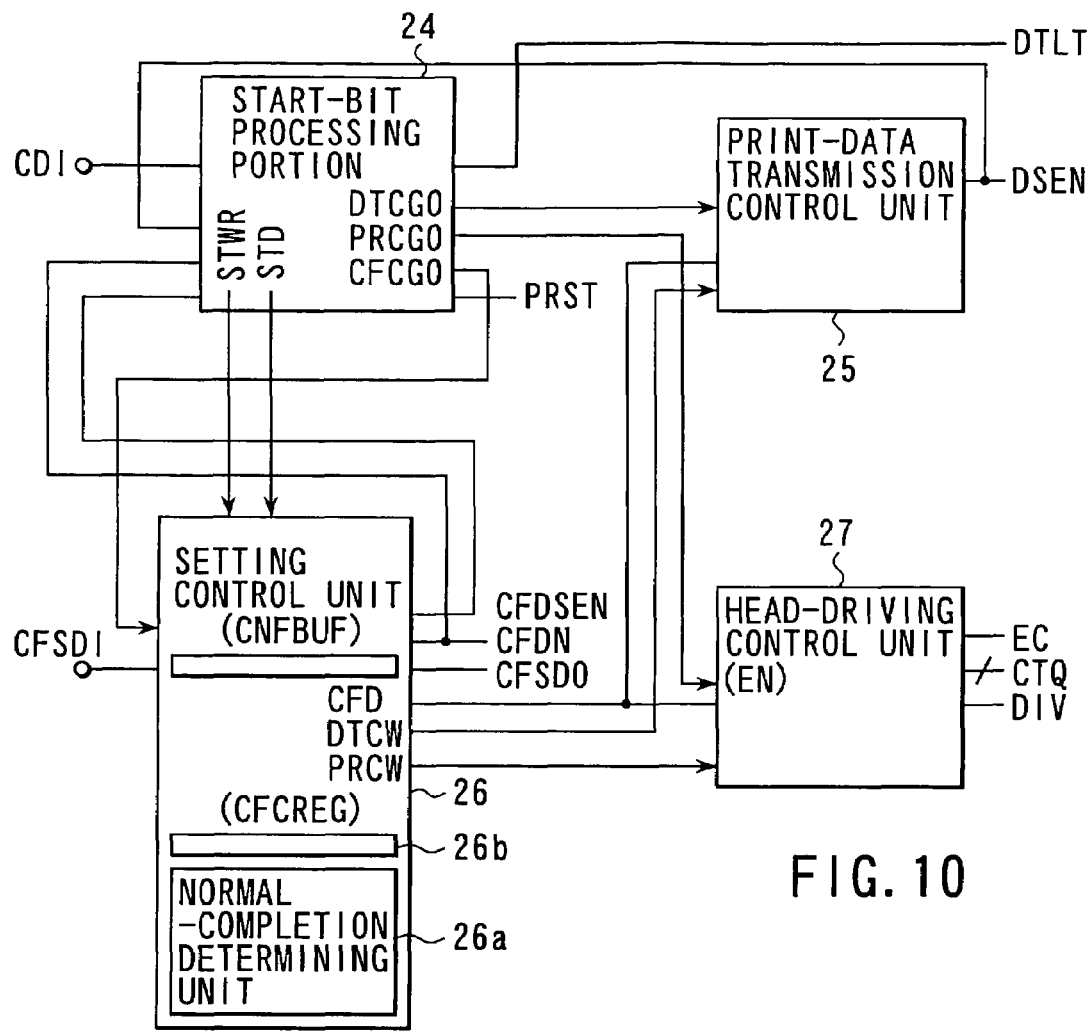
FIG. 10 is a circuit diagram of a common control unit according to a fourth embodiment of the present invention.

Each of the print-data transmission control unit 25 and the head-driving control unit 27 is provided with an internal setting register (not shown) with which setting is performed through the set-data buffer (CNFBUF) in the setting mode. The internal register has the same bit width as that of the set-data buffer (CNFBUF). The start-bit processing portion 24, the print-data transmission control unit 25, the setting control unit 26 and the head-driving control unit 27 shown in FIG. 2 are supplied with system clock (CK), system reset (RST) and port reset (PRST) (not shown). The foregoing units are operated in accordance with the system clock (CK) and reset in response to the system reset (RST) or the port reset (PRST). The units to be described later and shown in FIG. 10 are operated similarly.

The structure of serial data (SD) to be supplied to the head driving apparatus will now be described with reference to FIG. 3.

Figure 3:
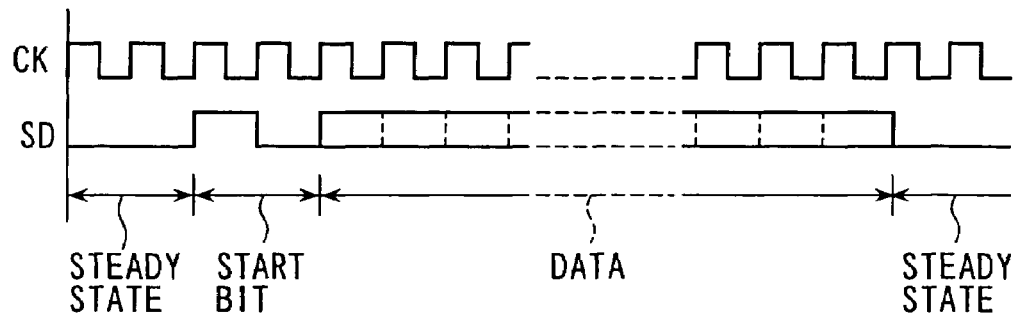
FIG. 3 is a diagram showing the structure of serial data which is supplied to the head driving apparatus according to the first embodiment.

FIG. 3 shows the format of serial data (SD). Serial data (SD) is constituted by start bit serving as startup information, data and an L-level steady state (fixed state) portion. Since the steady state is fixed to the L level, error in recognition between the steady state and the start bit can be prevented.

Serial data (SD) is supplied to the head driving apparatus in synchronization with the system clock (CK). In this embodiment, the start bit is constituted by two bits consisting of a H level and a L level.

Note that the start bit may be constituted by only one bit which is H level. In a case where the steady state in which data is not present as serial data (SD) is H level (the fixed level, the start bit may be constituted by only one bit which is the L level or plural bit starting with the L level.

Data following the start bit of the serial data (SD) is set data in a case of the setting mode. In a case of the printing mode, data above is print data which is driving control data. Set data above is used to set the number of transmissions (information about the number of transmissions of driving control data) of print data, and so on.

Figure 4:
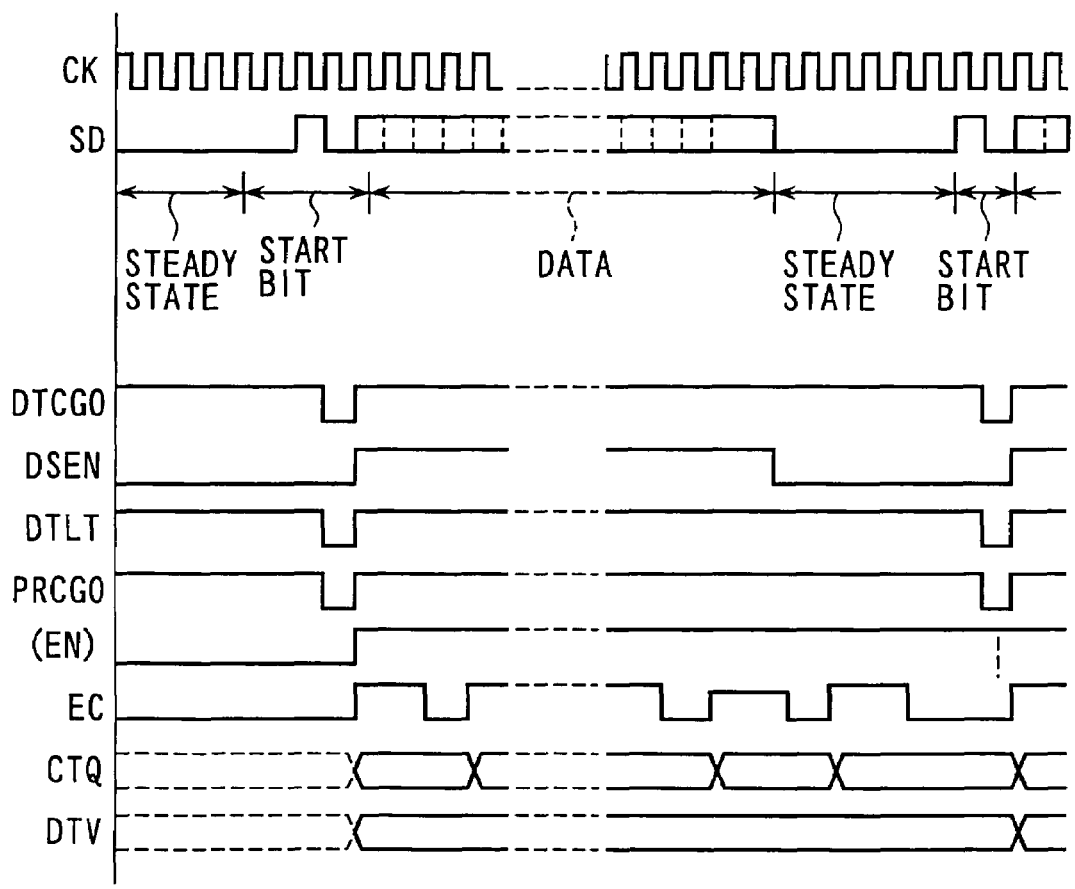
FIG. 4 is a diagram showing operation timing of the common control unit according to the first embodiment in a printing mode.

The operation timing of the common control unit 21 which is performed in the printing mode will now be described with reference to FIG. 4. In actual, the set mode is first performed. Since the description about the set mode will be performed later, the printing mode will now be described on the assumption that setting for controlling driving of the head control unit 22 has been performed with respect to the common control unit 21.

In the printing mode, supply of serial data (SD) for printing mode including the start bit and print data results in serial data (SD) for the printing mode being input to the common control unit 21 through a start-bit detecting terminal (CDI). Moreover, serial data (SD) for the printing mode is as well as input to the head control unit 22 through a data input terminal (SDI).

The start bit of the serial data (SD) for the printing mode is input to the start-bit processing portion 24 of the common control unit 21 so as to be detected. Print data following the start bit is transmitted to the head control unit 22 from the data input terminal (SDI).

As described above, each information of the start bit and data which has been time-divided into one serial data (SD) is divided into start bit and data by the two terminals.

When the start-bit processing portion 24 has detected the start bit of the serial data (SD) for the printing mode, the start-bit processing portion 24 simultaneously forms print data transmission start (DTCGO), print data latch signal (DTLT) and printing start signal (PRCGO).

At this time, the start bit is as well as supplied to the data input terminal (SDI). Since the print data transmission enable (DSEN) is not generated in the print-data transmission control unit 25 at this time, the start bit is not transmitted from the data input terminal (SDI) to the head control unit 22.

When the start bit has been detected, the control signals, which are the print data transmission start (DTCGO) for starting data transmission, the print data latch signal (DTLT) for latching data and the printing start signal (PRCGO) for starting control of the driving are simultaneously generated. Thus, each process is started. The start bit as well as serves as data transmission start information, data latching information and driving control start information as startup information for starting the apparatus.

After the print data transmission start (DTCGO) has been supplied from the start-bit processing portion 24 to the print-data transmission control unit 25, the print-data transmission control unit 25 is started. Thus, the print data transmission enable (DSEN) is formed so as to be output to the head control unit 22.

When the print data transmission enable (DSEN) is at the H level, information On the serial data (SD) is recognized as print data. Recognized print data is transmitted from the data input terminal (SDI) of the head control unit 22 to the print-data buffer (PRTBUF).

In the print-data transmission control unit 25, the number of steps of a shift register 31 to be described later is disposed in the print-data transmission control unit 25 in the set mode to be described later. Therefore, when the number of transmissions of print data is enlarged to a set value (the number of transmissions of print data), the print data transmission enable (DSEN) is made to be the L level. Thus, transmission of print data to the shift register 31 is interrupted.

As described above, the number of transmission of print data (information about transmissions of driving control data) is set to the print-data transmission control unit 25 of the common control portion in the set mode. Therefore, flexible adaptation is permitted in case of change of the print-data buffer (PRTBUF), and the transmission of print data can be performed. Although the conventional technique must simultaneously supply a transmission enable from outside, the first embodiment is able to eliminate a necessity of the foregoing supply. Therefore, data transmission can be performed with only serial data (SD).

In the set mode to be connected later, serial data (SD) for the set mode including set data is supplied. In the foregoing case, for example, the set capacity is made to be a predetermined value. Moreover, the operation of the hardware of the setting control unit 26 of the common control unit 21 is made to be adaptable to the capacity of set data. Thus, data transmission can be performed without simultaneous supplied of the transmission enable from outside.

The print data transmission enable (DSEN) has been fed back to the start-bit processing portion 24. The fed back print data transmission enable (DSEN) is used to make invalid detection of the start bit which is input from the start-bit detecting terminal (CDI) during transmission of print data. Thus, print data and start bit is distinguished from each other. Moreover, confusion with start bit and print data can be prevented.

In a period in which the print data transmission enable (DSEN) is at the H level, print data of serial data (SD) is transmitted to the print-data buffer (PRTBUF) in the head control unit 22 so as to be latched in response to the print data latch signal (DTLT) formed in the start-bit processing portion 24.

When the printing start signal (PRCGO) formed in the start-bit processing portion 24 is supplied to the head-driving control unit 27 simultaneously with the latching operation, the head-driving control unit 27 is started. Thus, the head-driving control unit 27 outputs, to the head control unit 22, control signals, such as common gray-level enable (EC), binary drop signal (CTQ) serving as a reference when the wide of a gray-level energizing signal is produced and division printing signal (DIV) for performing assignment when the ink chambers is grouped so as to be driven in a divided manner. Thus, driving of the head control unit 22 is controlled as described later so that a printing operation is performed.

As described above, the supply timing of the start bit, that is, the supply timing of serial data (SD) for printing mode, is adjusted. Thus, timing of the printing start signal (PRCGO) can be changed. Therefore, the position on printing paper on which print data is printed can be adjusted by simply changing the supply timing of serial data.

The circuit structure of the head control unit 22 will now be described with reference to FIG. 5.

The head control unit 22 incorporates a shift register 31 which is a storage means having a binary structure, the capacity of which corresponds to (number of binary data) k×(PIXEL) on the assumption that the units of binary data is PIXEL; and a latch circuit 32. The shift register 31 and the latch circuit 32 serving as the latch means constitute the print-data buffer (PRTBUF).

The head control unit 22 incorporates output pins DOn for outputting driving waveform for driving an ink jet head (not shown) in which ink chambers of 162 ink jet heads are formed; a comparator 33 for making a comparison between the binary drop signal (CTQ) and binary print data to form output (BPNCP) corresponding to each binary data in each PIXEL; an AND gate 34 for calculating logical addition of output (BPNCP) from the comparator 33 and common gray-level enable (EC) to output gray-level energizing signal (BPNE); a driven-ink-chamber selector 35 for selecting ink chambers in a group which is driven in a case where division driving is performed in response to the division printing signal (DIV); and an amplifier 36 for amplifying an output from the driven-ink-chamber selector 35 so as to output the driving waveform from the corresponding output pin DOn.

Figure 6:
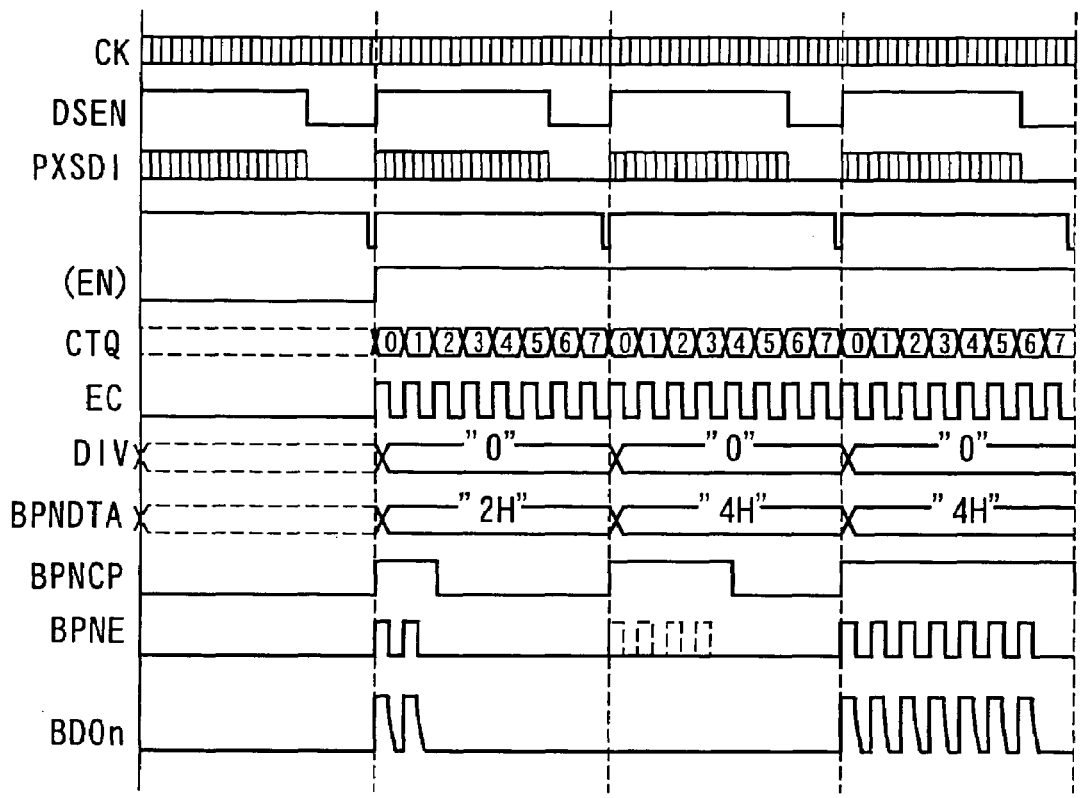
FIG. 6 is a diagram showing operation timing in a printing mode of the head driving portion according to the first embodiment.

The operation timing of the head control unit 22 which is performed in a case of the printing mode will now be described with reference to FIG. 6. Similarly to the case where the common control unit 21 has been described, an assumption is made that a predetermined setting has been performed in the set mode to be described later. An operation will now be described which is performed such that printing is controlled in accordance with input of serial data (SD) for the printing mode including the start bit.

When the print data transmission enable (DSEN) transmitted from the start-bit processing portion 24 of the common control unit 21 is at the H level, the head control unit 22 stores print data of serial data (SD) supplied from the data input terminal (SDI) in the shift register 31 of the print-data buffer (PRTBUF).

Then, data stored in the shift register 31 is latched by the latch circuit 32 in response to the print data latch signal (DTLT) supplied from the 27 of the common control unit 21. Data (BPNDTA) latched by the latch circuit 32 is input to the comparator 33 together with the binary drop signal (CTQ) supplied from the head-driving control unit 27 so as to be compared with each other. A result of the comparison is made to be comparator output (BPNCP) corresponding to each binary data for each PIXEL.

Figure 7:
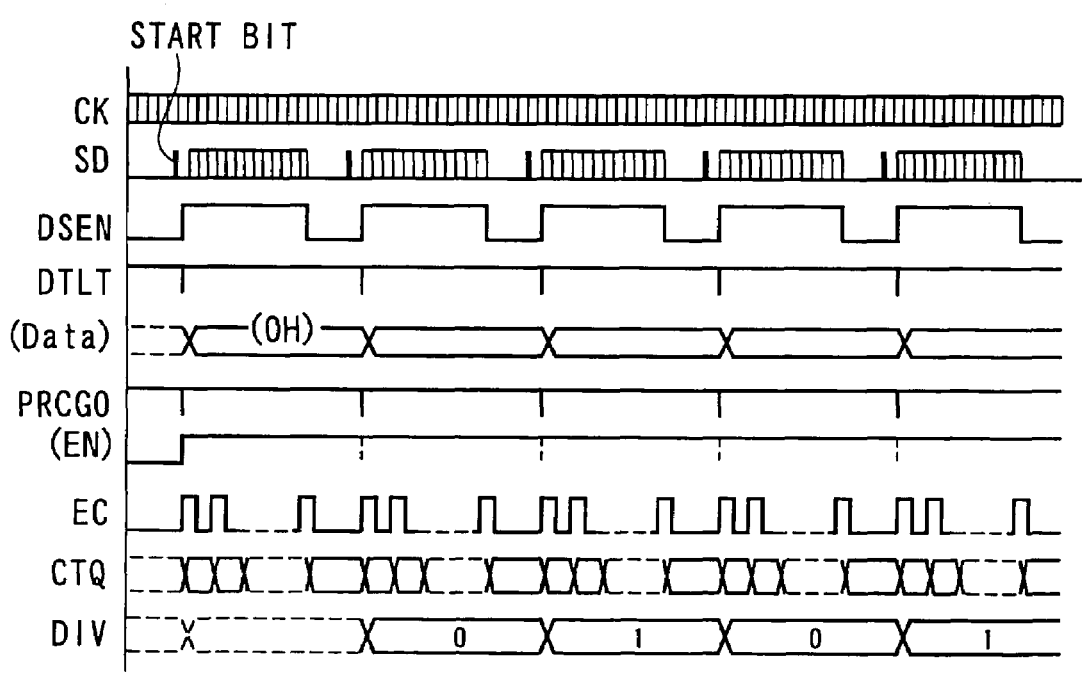
FIG. 7 is a diagram showing operation timing of the common control unit according to the first embodiment in the printing mode.

The logical addition of the comparator output (BPNCP) and the common gray-level enable (EC) is calculated by the AND gate 34 so as to be output as the gray-level energizing signal (BPNE). Thus, the output is supplied to the driven-ink-chamber selector 35. The driven-ink-chamber selector 35 selects the ink chambers to be driven in a case where bisectioned driving is performed in response to the division printing signal (DIV) supplied from the head-driving control unit 27 so as to output the gray-level energizing signal (BPNE) to the gray-level head driving signal output pins (DOn) for the ink chambers through the amplifier 36. The head control unit 22 is operated when the operation enable signal (EN) is at the H level to perform control of driving. FIG. 7 shows printing operation timing of the common control unit 21 shown in FIG. 2.

The operation timing of the common control unit 21 which is performed in a case of the set mode will now be described with reference to FIG. 9.

The head driving apparatus according to the first embodiment must performing setting with respect to the common control unit 21 in a case of the set mode to define the function prior to perform the printing operation.

Similarly to the serial data (SD) for the printing mode, serial data (SD) for the set mode is composed of start bit shown in FIG. 3 and data. Therefore, the common control unit 21 is started in accordance with the start bit of serial data (SD) for the set mode similarly to the foregoing printing mode also in the set mode.

Note that serial data (SD) for the set mode is different from serial data (SD) for the printing mode in a fact that the contents of data is set data. As set data of serial data (SD) for the set mode, data is loaded which is set to the internal setting register of each of the print-data transmission control unit 25 and the head-driving control unit 27 of the common control unit 21. The format of set data is composed of, for example, "(the bit width of setting register)×(the number of setting registers of the print-data transmission control unit 25 and the head-driving control unit 27)".

When serial data (SD) for the set mode including the start bit and set data has been input in the set mode, serial data (SD) for the set mode is input to the common control unit 21 through the start-bit detecting terminal (CDI). Moreover, serial data (SD) for the set mode is input to set-data input terminal (CFSDI) through the data input terminal (SDI).

The start bit of the serial data (SD) for the set mode is input to the start-bit processing portion 24 of the common control unit 21 so as to be detected. When the start-bit processing portion 24 has detected the start bit of serial data (SD) for the set mode, setting start signal (CFCGO) is formed.

After the setting start signal (CFCGO) has been supplied to the setting control unit 26, the setting control unit 26 is started. The setting control unit 26 makes the set-data transmission enable (CFDSEN) to be the H level so as to transmission the same to the set-data buffer (CNFBUF) and performs setting to the print-data transmission control unit 25 and the head-driving control unit 27. The set-data transmission enable (CFDSEN) is automatically made to be the L level after the setting operation has been completed. Thus, the setting operation is interrupted.

The set-data transmission enable (CFDSEN) has been fed back to the start-bit processing portion 24. The set-data transmission enable (CFDSEN) is used to make valid the detection of the start bit which is input from the start-bit detecting terminal (CDI) during transmission of set data. Thus, set data and start bit are distinguished from each other. Moreover, confusion with start bit and set data can be prevented.

Simultaneously with the transmission of set data, the setting control unit 26 inputs set data in units of bit-width of the set-data buffer (CNFBUF) while forming the address in the internal setting register. When the buffer has been filled with data, the setting control unit 26 sets set data (CFD) to the print-data transmission control unit 25 and the head-driving control unit 27 while outputting write signal (DTCW) and (PRCW) as set data (CFD). Thus, the functions of the print-data transmission control unit 25 and the head-driving control unit 27 are defined.

As a result of the foregoing operation, setting is performed. When a predetermined quantity of set data "(the bit width of the setting register)×(the number of internal setting registers)" has been transmitted, the setting operation is completed.

A method of changing the set mode and the printing mode will now be described with reference to FIG. 9. In the first embodiment, a special changing signal is not used.

Figure 9:
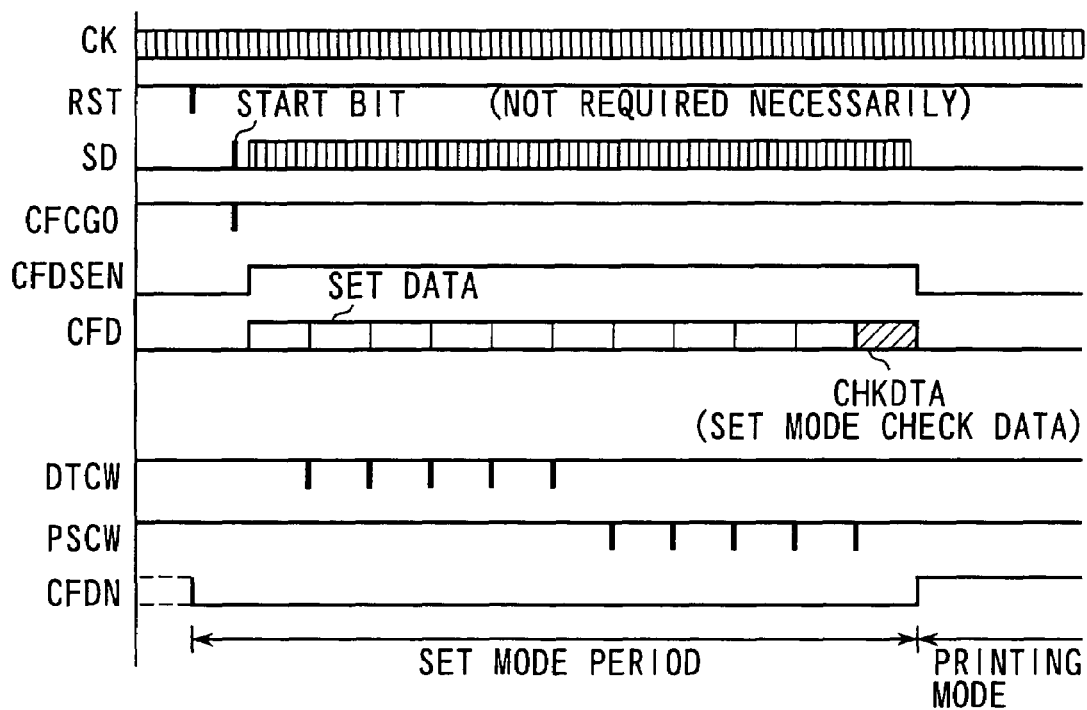
FIG. 9 is a diagram showing operation timing in a setting mode and a method of changing the mode in accordance with setting mode check data according to a third embodiment of the present invention.

That is, the operation timing of the common control unit 21 shown in FIG. 9 is arranged such that change to the set mode is performed owing to input of the system reset (RST). When the system reset (RST) has been input, the setting control unit 26 maintains the L level of the setting completion signal (CFDN). The reason for this lies in that setting must be performed to define the function after resetting has been performed. That is, the system reset (RST) is used to as well as serve as a switch signal to the set mode.

After the setting operation has been completed, the mode is automatically switched to the printing mode. When set data, for example, in a predetermined quantity has been transmitted, the setting control unit 26 recognizes completion of setting because transmission of set data has been completed. Then, the setting control unit 26 makes the setting completion signal (CFDN) to be the H level. The reason for this will now be described. Since the number of the setting registers to which setting must be performed has been determined, no problem arises when the mode is switched by only fixedly transmitting data in a predetermined quantity.

The setting completion signal (CFDN) indicates a fact that the set mode has been realized when the level is the L level. Another fact is indicated that the mode is the printing mode when the level is the H level. Therefore, the setting completion signal (CFDN) is used to recognize the present mode in the apparatus. Moreover, the setting completion signal (CFDN) is used to monitor the present mode from the outside of the apparatus.

In the first embodiment, setting with respect to the common control unit 21 must be performed in the set mode prior to performing the printing operation. Therefore, in case where incorrect setting to the internal setting register of the print-data transmission control unit 25 or the head-driving control unit 27 to which setting must be performed is performed, printing is undesirably performed in accordance with the setting. Therefore, there is apprehension that disorder of printing occurs. To prevent the foregoing problem, the first embodiment is structured as follows to confirm a normal completion of the setting.

Serial data (SD) for the set mode is added with check data (CHKDTA) shown in FIG. 9 at the trailing end of set data in order to make the sum of the set data and the total sum of all of set data to be "0" (predetermined value) at the lower position. The result of the addition is used as the set data.

The setting control unit 26 is provided with a normal-completion determining unit 26a serving as a normal completion determining means which incorporates an adder for adding all of set data (including check data (CHKDTA)) and a control unit for making a comparison between the total sum calculated by the adder and the predetermined value ("0" at the lower position) and changing the setting completion signal (CFDN) to be the H level when the total sum and the predetermined value are the same. The control unit maintains the L level of the setting completion signal (CFDN) when the total sum and the predetermined value are not the same.

The operation for determining whether or not normal completion has been made will now be described. As shown in FIG. 9, the setting control unit 26 adds all of set data at the timing (the timing of writing signals (DTCW) and (PSCW)) at which set data (CFD) is written from the set-data buffer (CNFBUF) on each of the setting registers in the setting mode.

The foregoing operation is repeated. When the total sum of all of set data (including check data (CHKDTA)) is "0" at the lower position, the normal-completion determining unit 26a changes the level of the setting completion signal (CFDN) from the L level to the H level. When the total sum of set data is not "0" at the lower position, the L level of the setting completion signal (CFDN) is maintained. Therefore, when setting has normally been completed, switching from the setting mode to the printing mode is performed. When setting has not normally been completed, switching to the printing mode is inhibited.

Thus, switching to the printing mode is inhibited in case where incorrect setting is performed to the internal setting register of the print-data transmission control unit 25 or the head-driving control unit 27. Therefore, undesirably printing in accordance with the incorrect setting is inhibited. As a result, disorder of printing can be prevented.

When a plurality of the head driving apparatuses are cascade-connected, the setting completion signal (CFDN) is connected in a wired OR manner among the plural head driving apparatuses. Therefore, the setting completion signal (CFDN) is not made to be the H level as long as setting of all of the head driving apparatuses are completed. Therefore, confirmation of completion of setting of the plural head driving apparatuses can be performed with a minimum number of signal lines.

Check data (CHKDTA) is not necessarily required to be provided at the trailing end of set data. The total sum of set data (including check data (CHKDTA)) is not necessarily required to be "0" when the total sum is a predetermined value.

As described above, serial data (SD) for the set mode is, in the set mode, input through the set-data input terminal (CFSDI) of the common control unit 21 so as to be transmitted to the set-data buffer (CNFBUF) and output from the set-data output terminal (CFSDO). In the printing mode, serial data (SD) for the printing mode is input through print-data input terminal (PXSDI) of the head control unit 22 so as to be transmitted to the print-data buffer (PRTBUF) and output from print-data output terminal (PXSDO).

The set-data output terminal (CFSDO) and the print-data output terminal (PXSDO) are connected to input terminals (C) and (P) of the transmission data selector 23. The output from the transmission data selector 23 is serial data output (SDO) which is used when the head driving apparatuses are cascade-connected.

The select terminal (S) of the transmission data selector 23 has been supplied with the setting completion signal (CFDN). When the setting completion signal (CFDN) is at the L level (the setting mode), the transmission data selector 23 causes set data supplied from the set-data output terminal (CFSDO) and input through the input terminal (C) to be output from the serial data output (SDO) terminal thereof. When the setting completion signal (CFDN) is at the H level (the printing mode), print data supplied from the print-data output terminal (PXSDO) through the input terminal (P) is output from the serial data output (SDO). As a result, the set-data buffer (CNFBUF) and the print-data buffer (PRTBUF) of each of the head driving apparatus can be cascade-connected in either of the setting mode and the printing mode.

In the first embodiment, the three signal lines, that is, the serial data (SD) having the start bit for starting the apparatus and data, the clock (CK) and the reset (RST), are input. Thus, the operation including the control of the transmission of data, setting of the inside portion of the apparatus and the control of the driving of the driven elements can reliably be performed.

Moreover, the apparatus is stared at the timing obtained by detecting the start bit of the serial data (SD). Therefore, the printing timing can be adjusted by adjusting the supplying timing of serial data (SD).

Moreover, the start bit of the serial data (SD) input in the setting mode or the printing mode and data can be distinguished from each other. Therefore, incorrect recognition between the start bit and data can be prevented.

Moreover, the setting mode for performing required setting to perform the control of the printing operation in accordance with set data can be performed at the timing obtained by detecting the start bit by inputting serial data including the start bit as well as the printing mode for controlling the driving of the ink chambers of the printing head in accordance with print data. Therefore, any increase in the number of the signal lines for performing the setting is not required.

Since the set mode is provided, definition of the apparatus can flexibly be changed by performing the setting. As a substitute for result, control of driving can be performed in a manner adaptable to the hardware structure of the apparatus, for example, change in the combination of the buffers and the number of the cascades in a case where the apparatus is cascade-connected.

When the process in the set mode has been performed in response to the reset signal and the setting has been completed, the mode is automatically switched to the driving control mode. Thus, the driving of the subject, which must be driven, is performed. Therefore, the signal line for switching the mode is not required.

Second Embodiment

Figure 8:
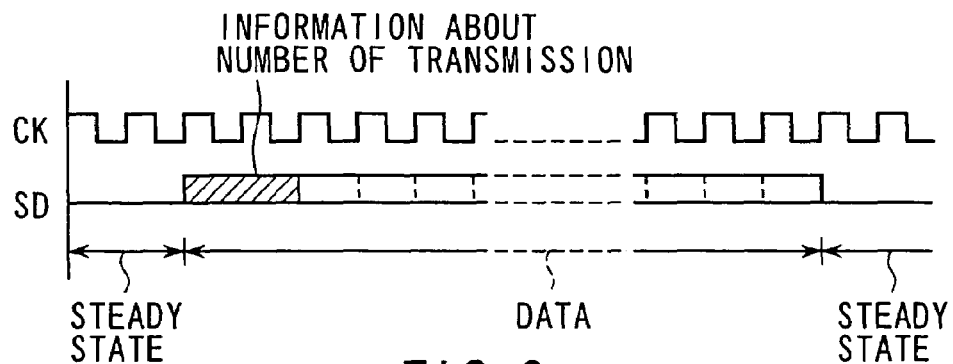
FIG. 8 is a diagram showing a structure that serial data having information about the number of transmissions is used in a head driving apparatus according to a second embodiment of the present invention.

The second embodiment is arranged such that set data, for example, information about the number of transmissions of control data or print data, is provided for serial data as described in the first embodiment. The provision of information about the number of transmissions does not require provision of the start bit which is required in the first embodiment. Therefore, information about the number of transmissions is provided for serial data with the trigger signal from external instead of the start bit as shown in FIG. 8 permits the information about the number of transmissions which is a control signal used for the conventional head driving apparatus to be omitted.

As a matter of course, the print-data transmission control unit 25 must be provided for the driving apparatus. Thus, transmitted information about the number of transmissions is set to make a comparison between transmitted print data or the like and supplied information about the number of transmissions so as to perform proper control of transmission of print data as well as simple provision of information about the number of transmissions for serial data.

Third Embodiment

A third embodiment is arranged to use the method of switching between the set mode and the printing mode as disclosed in the first embodiment. The foregoing switching method does not require provision of the start bit according to the first embodiment.

Therefore, in the third embodiment, for example, as shown in FIG. 9, set-mode check data (CHKDTA) is added to the trailing end of set data in the serial data, and the trigger signal from external is used instead of the start bit in serial data of the first embodiment. When the driving control apparatus has received set data, the setting control unit 26 calculates the total sum of all of set data (including check data (CHKDTA)). When the total sum is "0" at the lower position, a determination is made that transmission of the set mode has reliably be performed. Then, the mode is changed from the set mode to the printing mode. Specifically, the setting completion signal (CFDN) is changed to, for example, the H level. Hence it follows that a head driving control apparatus and a method therefor can be provided which does not require the control signal for switching the mode which is required for the conventional head driving control apparatus.

Fourth Embodiment

A fourth embodiment is arranged such that the start bit (STD) of serial data is divided into a plurality of sections (time-divided) as an alternative to switching the mode to the set mode when the system reset (RST) has been input from outside. Then, mode information is provided for the start bit (STD) to switch the mode in accordance with mode information.

Moreover, information about the number of transmissions of set data is provided for the start bit (STD) of the serial data (SD) for the set mode. Thus, set data which can be transmitted can be set without fixation of set data to a predetermined value.

Referring to FIGS. 10 to 13, the fourth embodiment will now be described in which the present invention is applied to a head driving apparatus of an ink jet printer.

Figure 12:
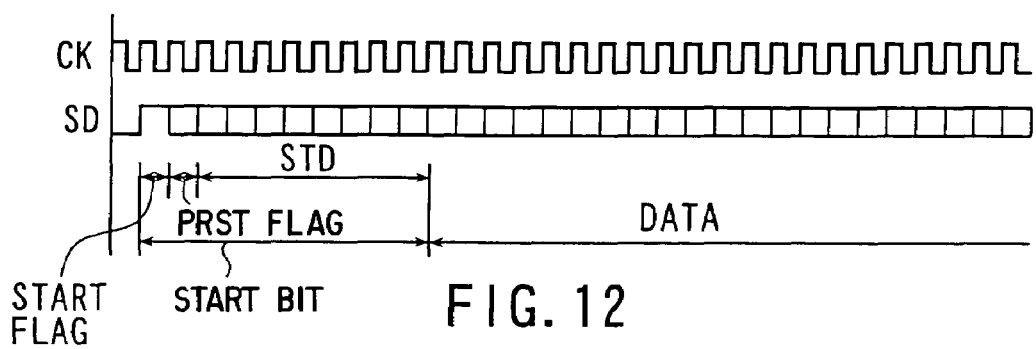
FIG. 12 is a diagram showing the structure of serial data which is supplied to a head driving apparatus according to the fourth embodiment.

In the fourth embodiment, serial data (SD) has a start bit (STD) which is 10 bits, as shown in FIG. 12. The start bit (STD) is composed of 1-bit start flag for performing setting or starting printing, 1-bit port reset (PRST) flag serving as mode information and 8-bit start bit (STD) serving as information about the number of transmissions of set data disposed in this order.

FIG. 10 is a diagram showing the circuit structure in a common control unit 21 according to the fourth embodiment. As compared with the first embodiment shown in FIG. 2, the reset signal (RST) provided for the conventional apparatus and in the first embodiment is omitted in this embodiment. Another difference is as follows: the start-bit processing portion 24 detects the start bit (STD) of the serial data (SD) to output start bit (STD) and (STWR) in accordance with a result of the detection. Moreover, in this embodiment, start bit data (STD) and start bit data write signal (STWR) supplied from the start bit processing portion are input to perform setting with respect to a setting control portion register (CFCREG) 26b. Another difference lies in that the start-bit processing portion 24 forms port reset (PRST) having a function (including a function for switching to the set mode) similar to that of a conventional external reset in accordance with PRST flag of start bit (STD) of serial data (SD) which is mode switching data.

Figure 11:
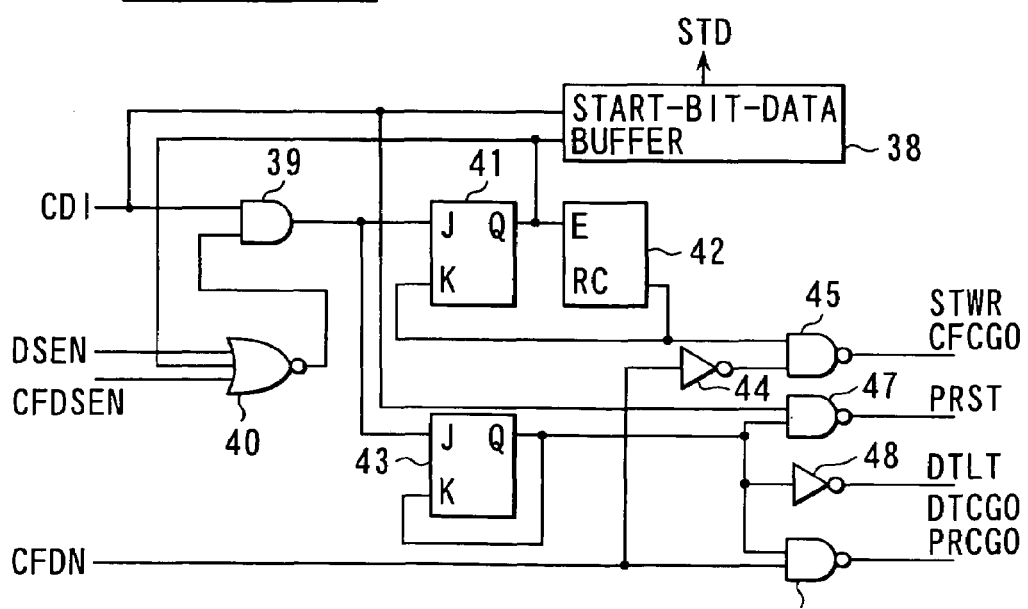
FIG. 11 is a circuit diagram of a start bit processing portion according to the fourth embodiment.

As shown in FIG. 11, the start-bit processing portion 24 according to the fourth embodiment incorporates a start-bit-data buffer 38 for temporarily storing data of start bit (STD) of serial data (SD); a 2-input AND gate 39 which is supplied with serial data (SD) input from the start-bit detecting terminal (CDI) to detect the start flag; and a 3-input NOR gate 40. Moreover, the start-bit processing portion 24 incorporates a JK flip-flop 41 for starting a counter 42 which uses the 3-input NOR gate 40 to inhibit detection of the start flag and the like in a period in which start bit (STD) is input to the start-bit-data buffer 38 when the start flag has been detected so as to count the start bit (STD) to the final bit.

Moreover, the start-bit processing portion 24 incorporates a JK flip-flop 43 for detecting the port reset flag of the start bit (STD); and a NAND gate 45 for outputting the setting start signal (CFCGO) also serving as a start bit data write signal (STWR) when the setting completion signal (CFDN) input through the NOT gate 44 is at the L level (the printing mode) and the count completion signal (RC) of the counter 42 has been input.

Moreover, the start-bit processing portion 24 incorporates a NAND gate 47 for outputting the port reset (PRST) when the JK flip-flop 43 has detected a fact that the port reset flag is "true" (the H level); a NOT gate 48 for inverting Q-output from the JK flip-flop 43 to output the print data latch signal (DTLT) when the input setting completion signal (CFDN) is at the L level (the printing mode); and a NAND gate 49 for receiving the setting start signal (CFCGO) and the Q-output from the JK flip-flop 43 to output the printing start signal (PRCGO) which also serves as the print data transmission start (DTCGO) in accordance with the setting start signal (CFCGO) and the Q-output.

Figure 13:
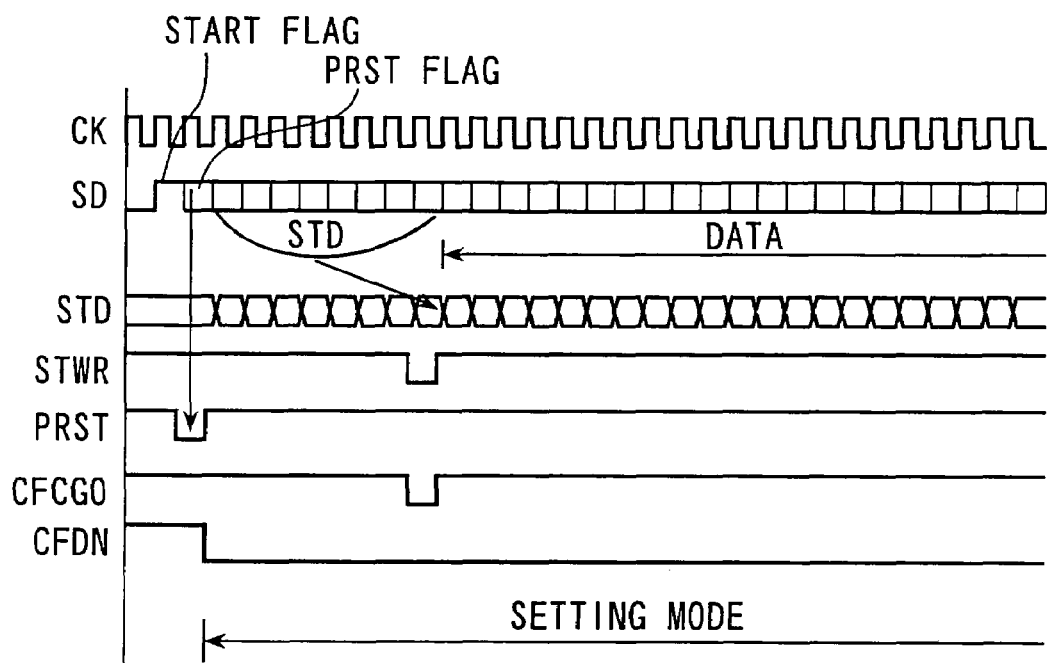
FIG. 13 is a diagram showing operation timing in the setting mode of the circuit shown in FIGS. 10 and 11 according to the fourth embodiment.

The operation timing in the set mode of the circuit shown in FIGS. 10 and 11 is shown in FIG. 13.

In the start bit processing portion, serial data (SD) for the set mode having the above-mentioned start bit (STD) is received by the start-bit detecting terminal (CDI). When the start flag of the start bit (STD) has been detected, the port reset flag following the start flag is confirmed. When the contents of the port reset flag is "true" (when switching to the set mode is performed), the port reset (PRST) is formed so as to be supplied to each circuit. That is, the port reset (PRST) has a function similar to system reset. Therefore, the apparatus is initialized and switching to the set mode are performed.

Eight bits following the start bit (STD) are start bit data (STD) having information about the number of set data items. Start bit data (STD) above is input to the start-bit-data buffer 38 in the start bit processing portion. When complete data items are obtained, data items are supplied to the setting control unit 26 together with the start bit data write signal (STWR). At this time, also the setting start signal (CFCGO) is supplied to the setting control unit 26.

Thus, the setting control unit 26 fetches data in a quantity corresponding to the number of set data of serial data (SD) in accordance with information about the number of set data of start bit data (STD). Therefore, when information about the number of set data is provided for the start bit data (STD) of start bit (STD), setting can be performed with serial data (SD) for the set mode having the different number of set data.

In the fourth embodiment, information about the number of set data is provided for start bit data (STD) of serial data for the set mode. The structure is not limited to the foregoing structure. Input as serial data (SD) for the set mode or the printing mode having information about the number of print data provided for start bit data (STD) or serial data (SD) for the printing mode is performed to set information about the number of print data to the print-data transmission control unit 25. In the foregoing case, transmission of print data corresponding to the capacity of the print-data buffer (PRT-BUF) can be performed without necessity for setting the number of transmissions of print data in the set mode.

In the fourth embodiment, the port reset flag (PRST) is provided following to the start flag as mode information so that the start-bit processing portion 24 detects the port reset flag (PRST) to determine the mode. Thus, the mode is switched. The present invention is not limited to the foregoing structure. As an alternative to the port reset flag (PRST), mode information permitting determination to be made whether the mode is the set mode or the printing mode is provided following to the start flag. As an alternative to port reset flag, mode information of the foregoing type is provided for set data so as to be detected. Then, the start-bit processing portion 24 determines the mode so as to switch the mode. Thus, the mode can be determined without use of the reset signal. Moreover, the mode can be switched.

As described above, start bit (STD) is divided into sections (time-divided) to provide various information regardless of the mode which is the set mode or the printing mode. Thus, flexibility can be imparted to the control which is performed in the set mode and the printing mode.

Fifth Embodiment

A fifth embodiment is structured such that the first embodiment of the present invention is arranged such that a plurality of cascade connections are established to be applied to the head driving apparatus of an ink jet printer. Referring to FIGS. 14 to 18, the fifth embodiment will now be described.

Figure 14:
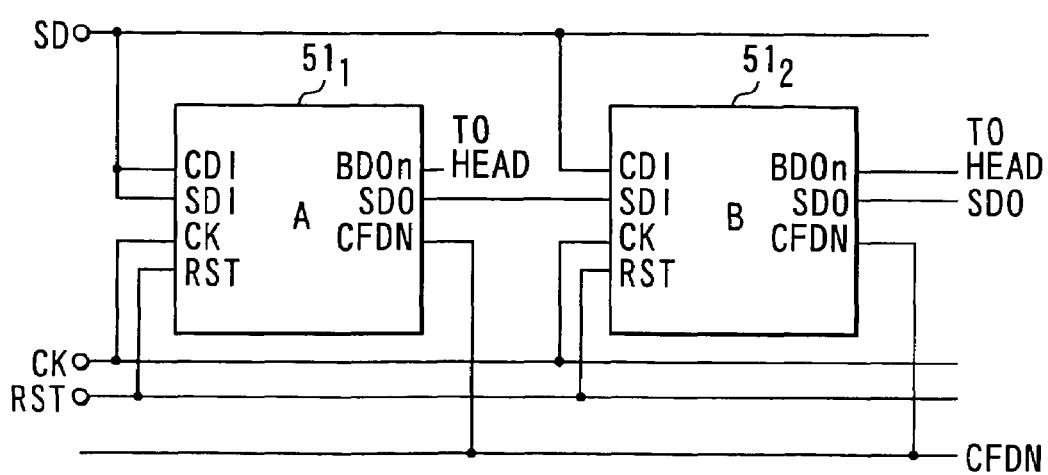
FIG. 14 is a circuit diagram showing a head driving apparatus according to a fifth embodiment of the present invention.

Specifically, as shown in FIG. 14, the serial data output terminal (serial data output (SDO)) of a first head driving apparatus (A) $51_1$ is connected (cascade-connected) to print-data input terminal (SDI) of a second head driving apparatus (B) $51_2$. Serial data (SD) supplied from outside is connected to the start-bit detecting terminal (CDI) of each of the head driving apparatuses $51_1$ and $51_2$ and the data input terminal (SDI) of the first head driving apparatus $51_1$. The system clock (CK) and the system reset (RST) are commonly input to the corresponding terminal of each head driving apparatus. As described above, the start-bit detecting terminal (CDI) of each head driving apparatus connects serial data (SD) in parallel. The reason for this lies in that detection of the start bit of serial data (SD) in each head driving apparatus must simultaneously be performed in terms of time.

In the first head driving apparatus $51_1$, the connection between the start-bit detecting terminal (CDI) and the data input terminal (SDI) is performed similarly to the connection which is performed in a case of a single head driving apparatus.

Transmission of data which is transmitted from the first head driving apparatus $51_1$ to the head driving apparatus $51_2$ owing to the cascade connection is controlled in response to the print data transmission enable (DSEN) or the set-data transmission enable (CFDSEN). Therefore, print data or set data is a portion of serial data (SD) from which the start bit is omitted.

The number of transmissions of print data of serial data (SD) for the printing mode is changed when the number of steps of the cascade of the head driving apparatus is changed. Therefore, the number of transmissions of all of print data items including the number of the cascades is, as set data, provided for the serial data (SD) for the set mode as in the first embodiment. Then, the number of transmissions of print data must be set to the print-data transmission control unit 25 of each head driving apparatus. As an alternative to this, the number of transmissions of all of print data including the number of cascades must be provided for the start bit of the serial data (SD) for the printing mode similar to the fourth embodiment so as to be provided for e head driving apparatus.

A state of cascade transmission which is performed in a case of the printing mode will now be described with reference to FIGS. 15 and 16.

Figure 15:
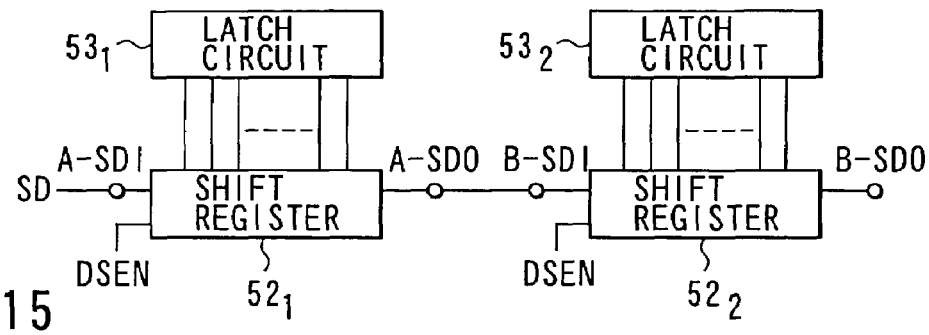
FIG. 15 is a diagram showing an example of connection of a print data buffer (PRTBUF) of each head driving apparatus in a case of cascade connection of the head driving apparatus shown in FIG. 14.

FIG. 15 shows an example of the connection of print-data buffer (PRTBUF) of each of the head driving apparatuses $51_1$ and $51_2$ in a case where the two head driving apparatuses $51_1$ and $51_2$ as shown in FIG. 14 are cascade-connected. The number of the shift registers $52_1$ and $52_2$ of the head driving apparatuses $51_1$ and $51_2$ and that of the latch circuits $53_1$ and $53_2$ are multiples of the number of cascades. Also the print data transmission enable (DSEN) of each of the head driving apparatuses $51_1$ and $51_2$ is valid for time which is a multiple of the number of the cascades.

Figure 16:
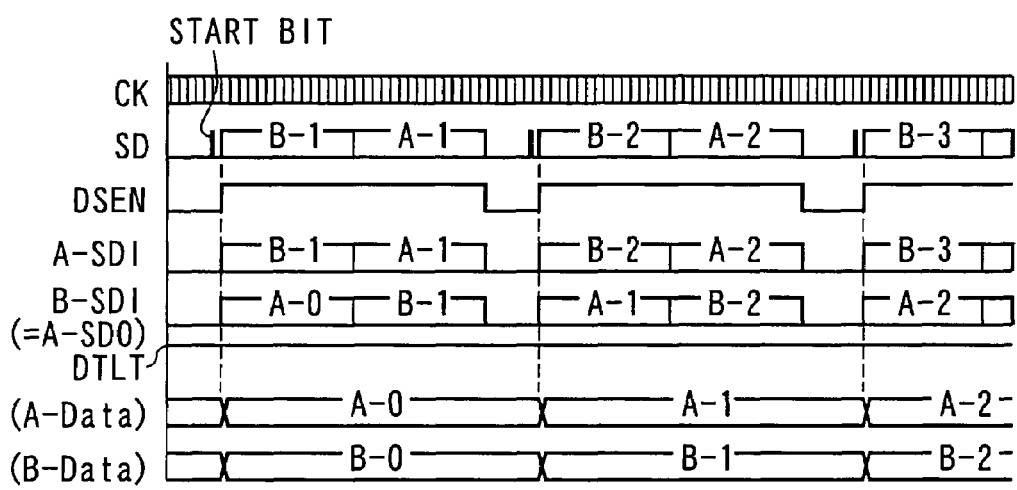
FIG. 16 is a diagram showing transmission timing in a printing mode in a case where the cascade has been established as shown in FIG. 15.

FIG. 16 is a diagram showing transmission timing in a printing mode in a case where the two head driving apparatuses $51_1$ and $51_2$ are cascade-connected.

In the foregoing case, the format of serial data (SD) for the printing mode is composed of the leading start bit, print data B–n(n=1, 2, . . . ,) to be supplied to the second head driving apparatus $51_2$ and print data A–n(n=1, 2, . . . ,) to be supplied to the first head driving apparatus 511 and an L-level steady state.

Referring to FIG. 15, the foregoing serial data (SD) for the printing mode is supplied through the data input terminal (A-SDI) of the first head driving apparatus 511 so as to be output from a serial data terminal (A-SDO) and supplied to a data input terminal (B-SDI) of the second head driving apparatus $51_2$. The print data transmission enable (DSEN) is used to perform control so that print data of serial data (SD) for the printing mode is transmitted to the shift registers $52_1$ and $52_2$ of the head driving apparatuses $51_1$ and $51_2$.

Print data (A-Data and B-Data) transmitted to the shift registers $52_1$ and $52_2$ is transmitted to the latch circuits $53_1$ and $53_2$ of the head driving apparatuses $51_1$ and $51_2$ in response to print data latch signal (DTLT) at the timing at which the head driving apparatuses $51_1$ and $51_2$ have detected the start bit of serial data (SD) for the next printing mode.

The operation will now be described when individual setting to the head driving apparatuses $51_1$ and $51_2$ is performed in the set mode in the driving control apparatus in which the two head driving apparatuses $51_1$ and $51_2$ are cascade-connected with reference to FIGS. 17 and 18.

In the set mode, the transmission data selector 23 of the first head driving apparatus 511 shown in FIG. 1 outputs set data input through the data input terminal (A-SDI) of the first head driving apparatus $51_1$ through the serial data output terminal (A-SDO). Thus, set data is supplied to the data input terminal (B-SDI) of the second head driving apparatus 512. Thus, the set-data buffer (CNFBUF) of each of the head driving apparatuses $51_1$ and $51_2$ is cascade-connected as shown in FIG. 17. Internal setting registers $55_1$ and $55_2$ to which information of set data is actually set are connected to the set-data buffers (CNFBUF) $54_1$ and $54_2$. The set-data buffer (CNFBUF) has the same bit width as that of each of the internal setting registers $55_1$ and $55_2$.

Then, set data is transmitted to the set-data buffer (CNFBUF) until the set-data buffer (CNFBUF) is fully filled with set data. Then, set data is sequentially written in the internal setting registers $55_1$ and $55_2$.

Figure 18:
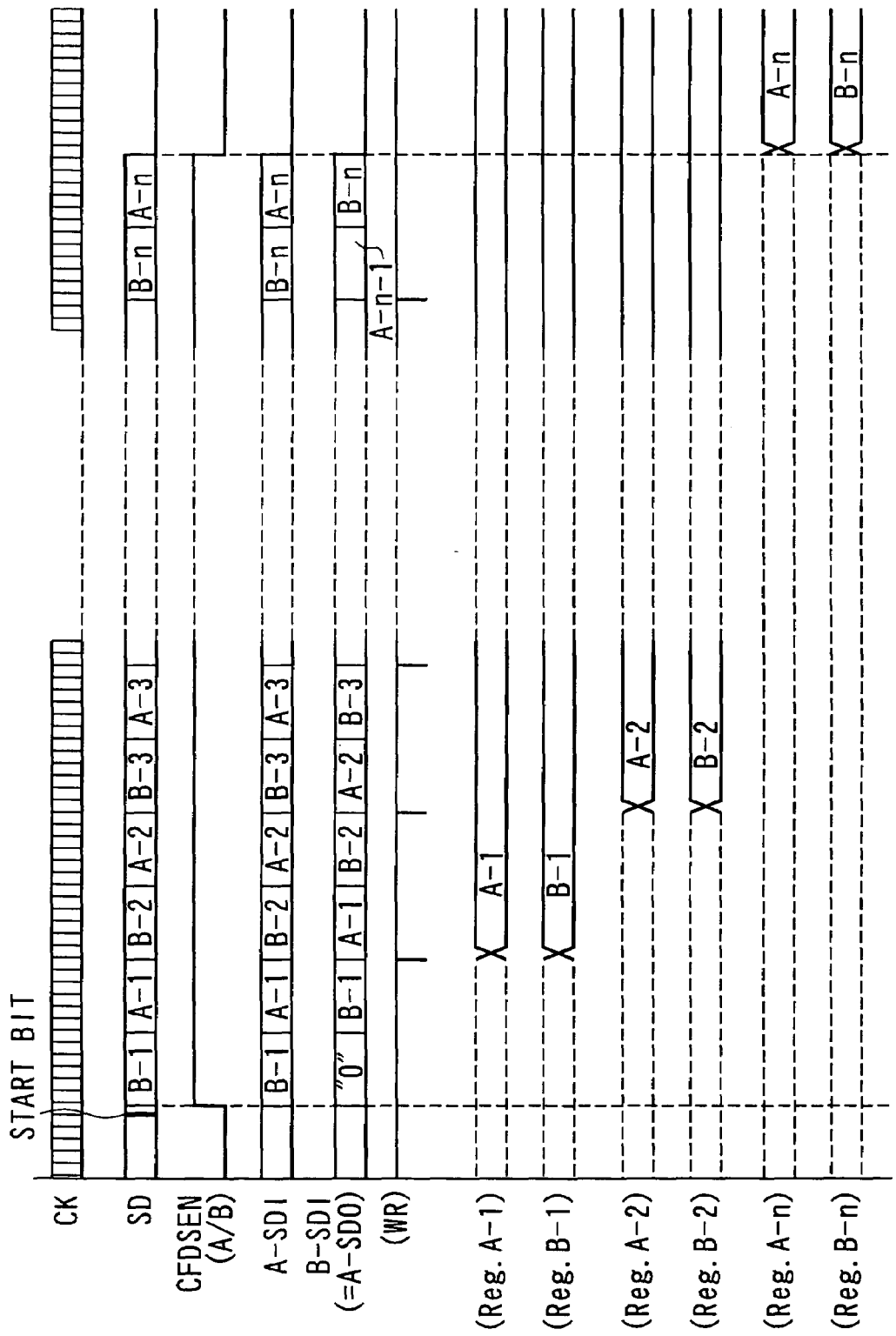
FIG. 18 is a diagram showing operation timing in a setting mode in a case where the cascade connection has been established as shown in FIG. 17.

The operation timing in the foregoing case is shown in FIG. 18.

The format of serial data (SD) for the set mode is composed of the leading start bit, following set data and an L-level steady state. Set data above is (the bit width)×(the number of cascades)×(the number of setting registers) to be adaptable to the state of cascade connection of the set-data buffer (CNFBUF). That is, as shown in FIG. 18, serial data (SD) for the set mode has a structure (B-1, A-1), (B-2, A-2), . . . , (B-n, A-n). That is, set data to be set to the internal setting registers of the cascade-connected head driving apparatuses $51_1$ and $51_2$ having the same number follows. Then, set data for the number n of the set registers follows.

The foregoing serial data (SD) for the set mode is input through the data input terminal (A-SDI) of the first head driving apparatus 511 so as to be output from the serial data output terminal (A-SDO) so as to be supplied to the data input terminal (B-SDI) of the second head driving apparatus $51_1$.

Each of the head driving apparatuses $51_1$ and $51_2$ generates set-data transmission enable (CFDSEN) when the start bit of serial data (SD) for the set mode. Thus, set data is fetched by each of the set-data buffers (CNFBUF) $54_1$ and $54_2$.

When, for example, set data (B-1, A-1) has been transmitted, set data B-1 is stored in the second set-data buffer (CNFBUF) $54_2$. Set data A-1 is stored in the first set-data buffer (CNFBUF) $54_1$.

Figure 17:
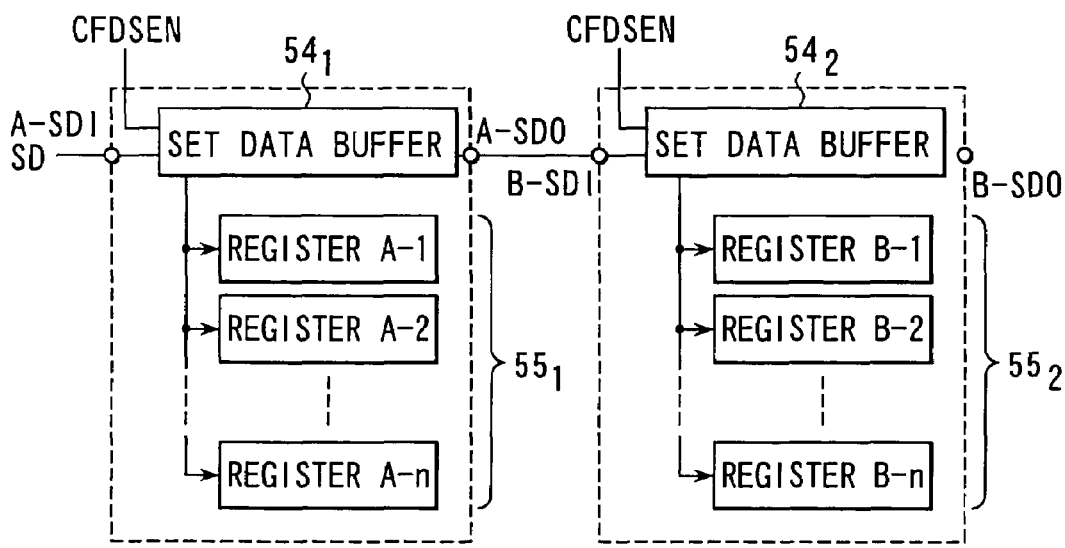
FIG. 17 is a diagram showing an example of the connection of a set data buffer (CNFBUF) of each head driving apparatus in a case where the cascade connection of the head driving apparatus shown in FIG. 14 has been established.

At this time, set data stored in each of the set-data buffers (CNFBUF) $54_1$ and $54_2$ is written on the corresponding setting register (having A-1, B-1 of FIG. 17). Thus, setting of individual data to each of the head driving apparatuses $51_1$ and $51_2$ can be performed.

The foregoing operation is sequentially repeated to (Bn, An) so that individual setting to all of the setting registers of each apparatus is permitted.

Start and completion of the set data will now be described.

The transmission of set data is performed in a period in which set-data transmission enable (CFDSEN) is output. In the foregoing case, set-data transmission enable (CFDSEN) is generated owing to detection of the start bit of serial data (SD) for the set mode. Therefore, transmission of set data is started. The completion of the transmission is sometimes varied owing to a variation factor caused from the number of the cascades.

The completion of transmission of set data is performed as follows.

The number of transmissions of set data is determined as follows:

(bit width of set-data buffer)

×(number of set registers)

×(the number of cascades)         (1)

In the foregoing equation (1), (bit width of set-data buffer)×(number of set registers) is a specific value for each head driving apparatus. Therefore, change in (the number of cascades) causes the number of transmission of set data to be changed.

Therefore, when the (the number of cascades) is a specific value owing to the width of the printing head or the like, the (the number of cascades) is a fixed value. Therefore, the value of the equation (1) can be made to be a fixed value. In the foregoing case, the foregoing fixed value is, as the number of transmission of set data, previously defined in the setting control unit 26 of the common control unit 21 of each head driving apparatus. Moreover, a counter is provided which performs counting corresponding to the number of transmission of set data.

When the start bit of serial data (SD) for the set mode has been detected, set-data transmission enable (CFDSEN) of the setting control unit 26 is made to be the H level to cause transmission of set data to be started. Moreover, the counter is started. When counting corresponding to the number of the set data items and performed by the counter has been completed, the set-data transmission enable (CFDSEN) is made to be the L level. Thus, transmission of set data is completed.

When the (the number of cascades) is changable, the embodiment can be modified as follows. That is, the information about the number of transmitted set data is provided for the start bit of serial data (SD) for the set mode similarly to the fourth embodiment. Information above is set to the setting control unit 26 as information about the number of cascades so that the number of set data items is defined. Thereby, the counter counts by the number of set data similarly to the case, and the set-data transmission enable (CFDSEN) is made to be the L level. Then, transmission of set data is completed.

As a result, set data having different contents among the cascade-connected head driving apparatuses can be transmitted to each head driving apparatus regardless of the number of the cascade-connected head driving apparatuses without any increase in the number of the signal lines.

The fifth embodiment structured as described above enables both of the set mode and the printing mode of each of the head driving apparatuses to be performed with a small number of signal lines in case where a plurality of the head driving apparatuses are connected by the cascade connection to constitute the driving control apparatus. As a result, control of the driving of the medium which must be driven can be performed.

In the fifth embodiment, two head driving apparatuses are connected. When three or more head driving apparatuses are connected, the following print-data input terminal (SDI) is connected to the forward serial data output terminal (SDO). Therefore, when a multiplicity of head driving apparatuses are connected, driving of the medium which must be driven can be controlled without any increase in the number of the signal lines.

Figure 19:
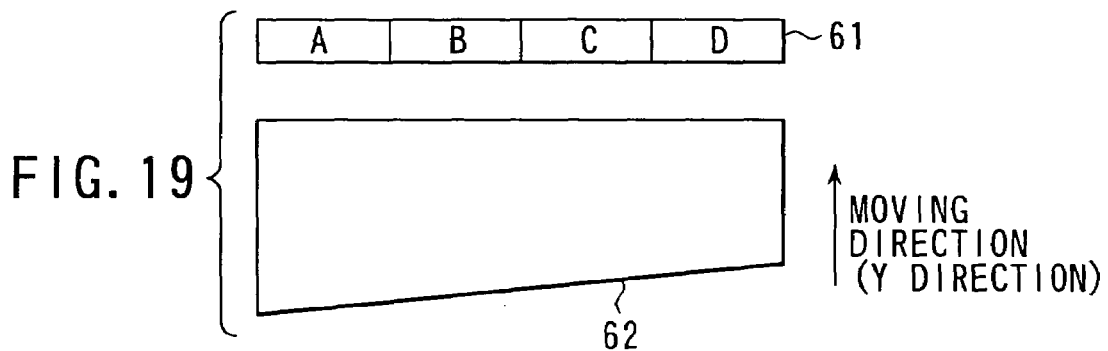
FIG. 19 is diagram showing a printing head which is operated in a head driving apparatus according to a fifth embodiment and which has a structure formed by integrating four pieces.
Figure 20:
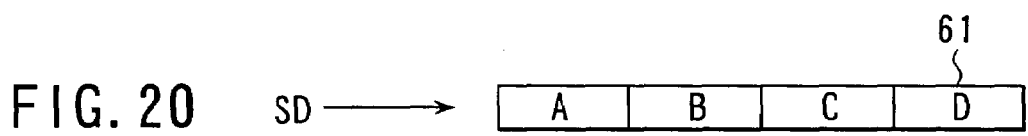
FIG. 20 is a diagram showing serial data which is transmitted to each head driving apparatus for driving each divided portion of the printing head shown in FIG. 19.
Figure 21:
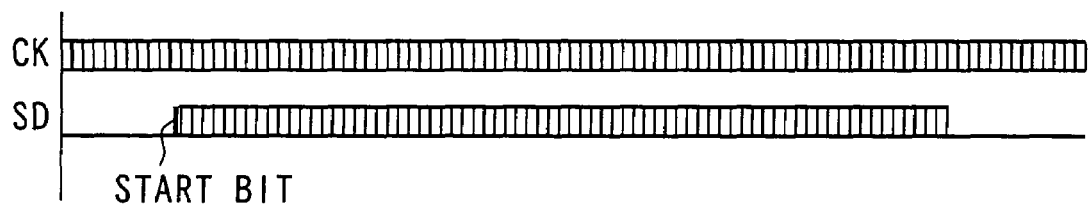
FIG. 21 is a diagram showing operation timing of serial data which is transmitted to the head driving apparatus for driving each divided portion of the printing head shown in FIG. 19.

For example, four head driving apparatuses are cascade-connected such that a printing head 61 having an integral shape and arranged to output of printing for one line as shown in FIG. 19 is disposed perpendicular to a direction in which paper 62 is moved. In the foregoing case, the printing head 61 is sometimes divided into four sections A to D. In the foregoing case, the sections A to D of the printing head 61 are driven by supplying serial data (SD) for the printing mode as shown in FIG. 20 to the four head driving apparatus apparatuses which are cascade-connected.

Figure 22:
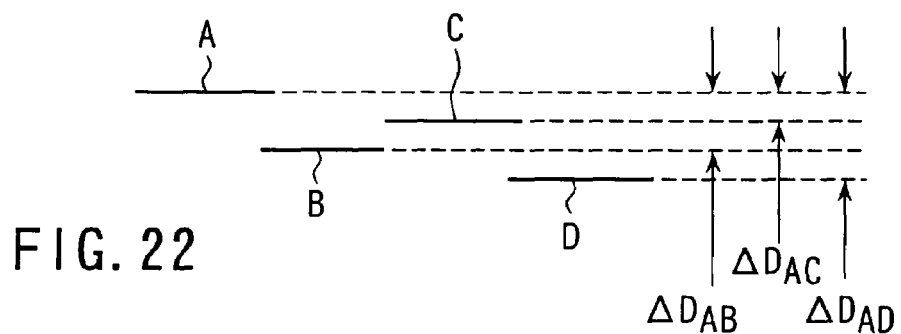
FIG. 22 is a diagram showing an error in joining in each divided portion in a case where the four divided portions of the printing head which is driven in the fifth embodiment are individually constituted.

FIG. 19 shows the printing head 61 which has the integral shape. When the sections A to D of the printing head 61 are individually formed, the sections A to D cannot easily accurately be arranged perpendicular to the direction in which the paper is moved. Therefore, an error in joining occurs as shown in FIG. 22. An assumption is made that the section B encounters error ΔDAB, C counters ΔDAC and D encounters ΔDAD with reference to the section A serving as a reference. The foregoing errors in joining exert adverse influences on the quality of printing because printing is undesirably deviated.

Figure 23:
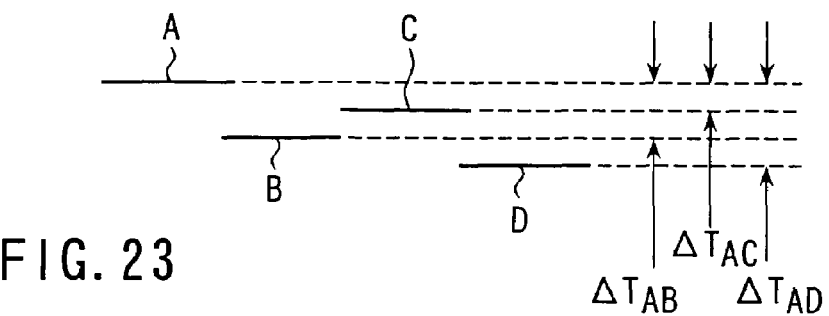
FIG. 23 is a diagram showing an amount of deviation of the operation timing of each head driving apparatus for eliminating the errors in joining shown in FIG. 22.

In the foregoing case, the amount of deviation of driving timing of each head driving apparatus for eliminating joint errors (ΔDAB, ΔDAC and ΔDAD), that is, print gap time (ΔTAB, ΔTAC and ΔTAD) as shown in FIG. 23 corresponding to the joint errors (ΔDAB, ΔDAC and ΔDAD) are previously obtained by performing experiments or the like.

Figure 24:
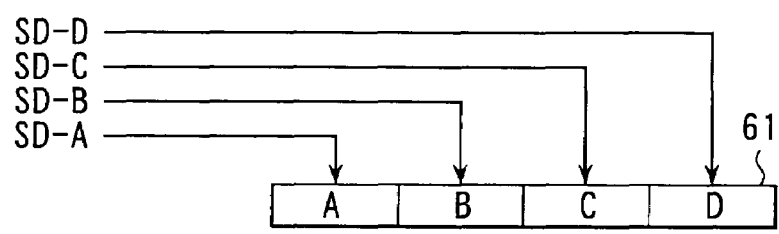
FIG. 24 is a diagram showing serial data which is transmitted to a head driving apparatus for driving each divided portion of the printing head having the error in joining shown in FIG. 22.
Figure 25:
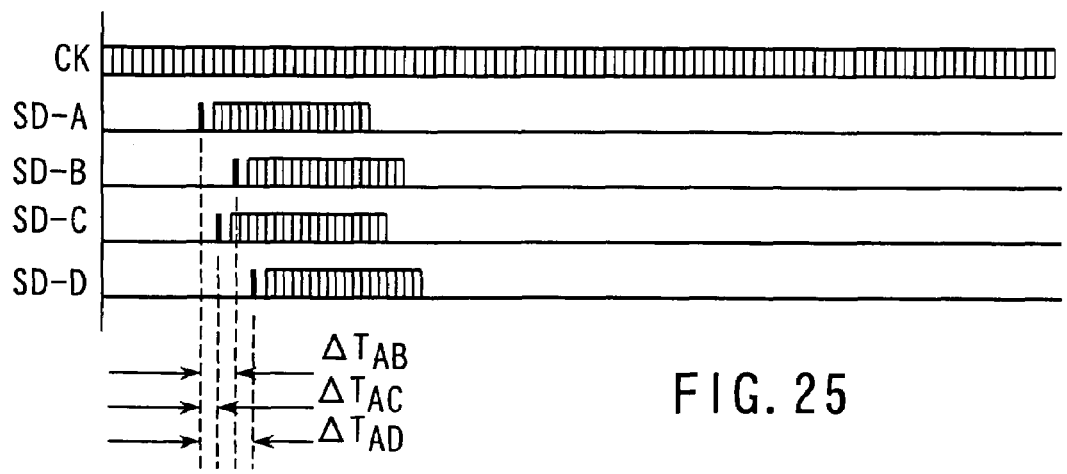
FIG. 25 is a diagram showing transmission timing of serial data which is transmitted to each driving apparatus for driving each divided portion of the printing head shown in FIG. 22.

Moreover, as shown in FIGS. 24 and 25, serial data (SD-A to SD-D) for the printing mode for each head driving apparatus is independently supplied. Moreover, timing of the supply is deviated to correspond to the print gap time (ΔTAB, ΔTAC and ΔTAD).

As a result, each head driving apparatus controls driving by detecting start bit of serial data (SD-A to SD-D) for the printing mode. Therefore, the sections A to D of the printing head 61 are driven at the timing at which serial data (SD-A to SD-D) for the printing mode is supplied. Hence it follows that deviation in printing caused from joint error of the printing head 61 or the like can be prevented. As a result, an adverse influence on the quality of printing can be eliminated.

Sixth Embodiment

A sixth embodiment has a structure that the structure according to the first embodiment of the present invention is applied to a head driving apparatus in a case where the printing head of an ink jet printer can be divided into both of two sections or four sections. The sixth embodiment will now be described with reference to FIG. 26.

Figure 26:
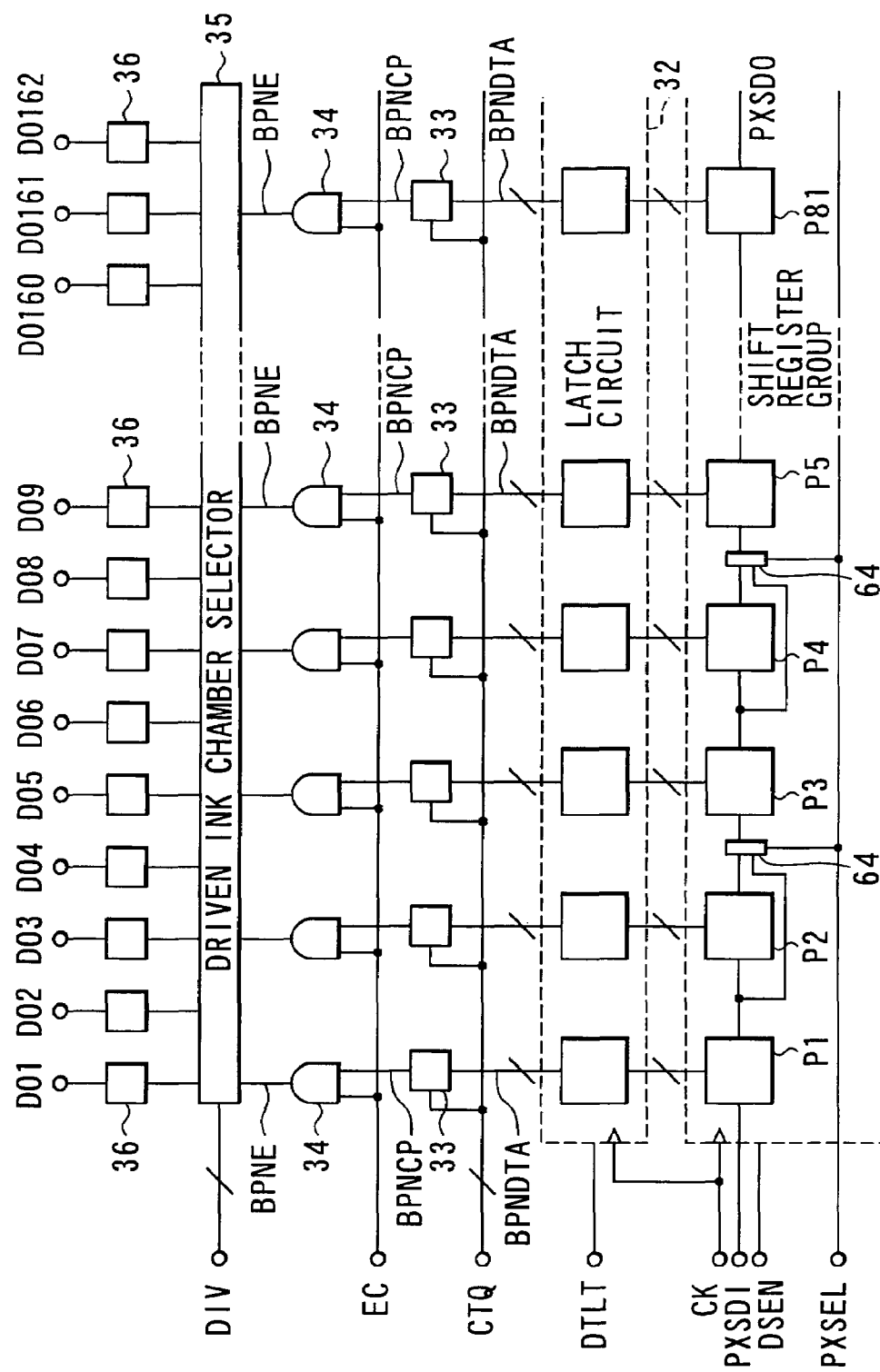
FIG. 26 is a circuit diagram of a head driving portion according to a sixth embodiment of the present invention.

FIG. 26 is a diagram showing the circuit structure of a head driving portion in a case where the printing head can be divided into both of two sections or four sections. The same elements as those of the circuit shown in FIG. 5 which is employed when the printing head is divided into two sections are given the same reference numerals and the same elements are omitted from description.

Figure 5:
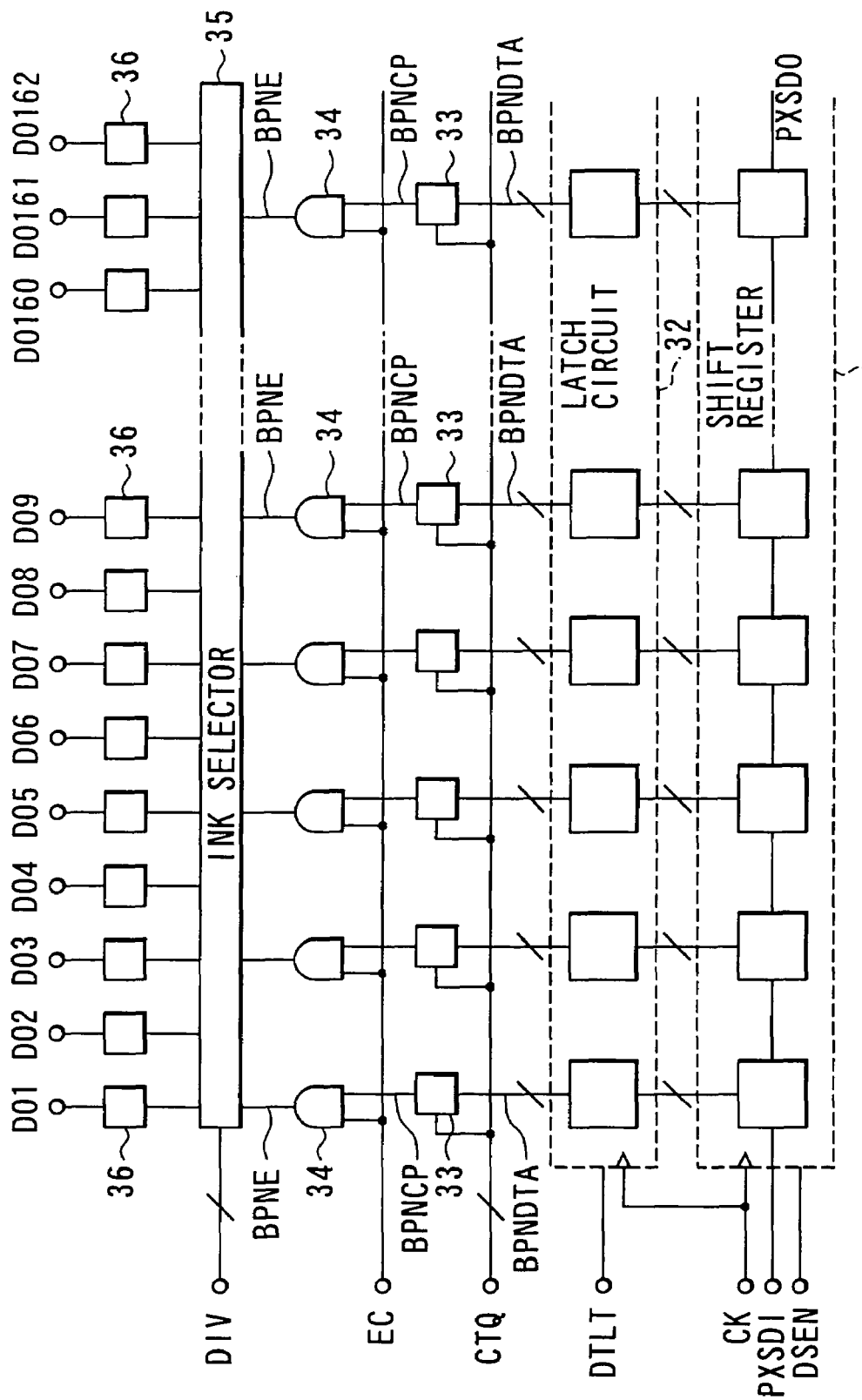
FIG. 5 is a circuit diagram of the head driving unit shown in FIG. 1.

As compared with the head driving portion shown in FIG. 5, a head driving portion 22 according to the sixth embodiment incorporates data selectors 64 provided for the shift register 63 at positions between PIXEL (P2) and PIXEL (P3), between PIXEL (P4) and PIXEL (P5), . . . and so on. The data selectors 64 are disposed at intervals of two PIXEL to select print data from the immediately or two preceding PIXEL to supply print data to the following PIXEL so as to assign print data. Another difference lies in that a print data switch signal (PXSEL) which is a selection signal of the data selector 64 is added. The print data switch signal (PXSEL) can be assigned to one of the set data, and supplied through the head-driving control unit 27 in FIG. 2. Since the foregoing structure is employed, one-PIXEL print data corresponds to two ink chambers or one-PIXEL print data corresponds to four ink chambers.

Since the sixth embodiment is structured as described above, print data to be transmitted to the shift register 31 is shifted to PIXEL (P1), (P2), (P3), (P4) or PIXEL (P1), (P3), (P5), (P7), . . . , in response to print-data switch signal (PXSEL).

As described above, shifted print data stored in the shift register 31 is latched by the latch circuit 32 in response to the print-data latch signal (DTLT). Data (BPNDTA) latched by the latch circuit 32 is, together with binary drop signal (CTQ), input to the comparator 33 so as to be compared with each other. A result of the comparison is made to be comparator output (BPNCP) corresponding to each binary data for each PIXEL.

The logical addition of the comparator output (BPNCP) and common gray-level enable (EC) is calculated by the AND gate 34 so as to be output as the gray-level energizing signal (BPNE) and supplied to the driven-ink-chamber selector 35.

When the four-division driving operation is performed in response to the division printing signal (DIV) supplied from the head-driving control unit 27, the driven-ink-chamber selector 35 selects ink chambers in a group which is driven to output the gray-level energizing signal (BPNE) to the output pins (DOn) through the amplifier 36. The head control unit 22 is operated when the operation enable signal (EN) is at the H level so as to control driving.

Thus, the output on the basis of print data shifted to the PIXEL of the shift register 63 is assigned to the corresponding four or two ink chambers in accordance with the state of the division printing signal (DIV) by the driven-ink-chamber selector 35.

As described above, the data selector 64 is provided for the shift register 63 of the print-data buffer (PRTBUF) to permit change of the combination of the buffers. Thus, the number of stages of the shift registers 63 according to the sixth embodiment can be halved in accordance with the state of the print-data buffer switch signal (PXSEL). Thus, the number of transmissions of print data can be reduced.

In the foregoing case, setting of the number of transmissions of data in the print-data transmission control unit 25 is changed, it can be coped with change in the number of transmissions of print data as described above. Another structure may be employed in which serial data (SD) having the start bit provided with information about the number of transmissions of print data is supplied. Thus, setting of the corresponding internal register of the print-data transmission control unit 25 is changed in the set mode or the number of transmissions of print data is set in the printing mode.

In the first to sixth embodiments, the medium which must be drive is the ink chamber in the printing head of the ink jet printer. Moreover, the head driving apparatus for driving the ink chamber is used to constitute the driving control apparatus. The present invention is not limited to the foregoing structure. As a matter of course, the present invention may be applied to a driving control apparatus for driving a medium, such as a motor, CCD or liquid crystal, which must be driven in accordance with driving control data for the load or the driven elements to obtain the operation and effect to decrease the control signals.

In the first to sixth embodiments, the set mode is required. The present invention is not limited to the foregoing structure. In a case where the set mode is not present, that is, in a case where a specific setting has been performed, the control of driving may be performed with only serial data.

As described above, according to the first embodiment, the driving control apparatus is provided in which start bit information which is startup information is added to serial data. Moreover, required control signals are formed in the inside portion of the apparatus in accordance with the timing at which start bit information has been detected so as to form the driving signal so as to control driving the medium which must be driven. Thus, the control signals, such as the enable signals, required for the conventional apparatus are not required.

The second embodiment is structured such that information about the number of transmissions of control data and print data is provided to the inside portion of serial data. Therefore, for example, the transmission enable signal which is the control signal required for the conventional head driving apparatus is not required. Hence it follows that the driving control apparatus can be provided which is free from the necessity for, from outside, independently supplying the timing at which print data is transmitted.

The third embodiment is structured, for example, as shown in FIG. 9 such that set mode check data (CHKDTA) is added to the trailing end of set data. When the setting control unit 26 of the driving control apparatus has received set data, the total sum of all of set data (including check data check data (CHKDTA)) is calculated. When the total sum is, for example, "0" at the lower position, a determination is made that transmission of the set mode has reliably been performed. Thus, the mode is changed from the set mode to the printing mode. Hence it follows that the driving control apparatus can be provided which is not required to use the control signal with which the mode is switched and which has been required for the conventional head driving control apparatus.

The fourth embodiment has the structure that the start bit of serial data is divided into plural sections (time-divided) as a substitute for the method of performing switching to the set mode by inputting the reset signal (RST) from outside. Thus, the start bit is provided with mode information. Thus, the driving control apparatus switches the mode by forming the internal reset signal (PRST) in accordance with mode information. The foregoing driving control apparatus is provided. As a result, driving control apparatus which does not require the reset signal supplied from outside and required for the conventional apparatus and which is able to perform similar control of driving and a driving control method can be provided.

According to the fifth embodiment, the driving method is provided with which a common control signal is supplied to the driving control apparatuses according to the first embodiment and which are cascade-connected. Thus, a plurality of the driving control apparatuses can be operated with a very small number of signal lines as compared with the conventional apparatus.

The sixth embodiment has the structure that the data selector 64 for assigning print data is provided for the head driving control apparatus according to the first embodiment and shown in FIG. 5. Thus, change in the combination of the buffers can be performed. As a result, the head driving control apparatus for driving the printing head into four sections and the method therefor can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A driving apparatus comprising:
    forming means for receiving serial data including start bit and driving control data and detecting the start bit from the serial data so as to form control signals in accordance with the detected start bit;
    storing means for storing the driving control data in a storage region in accordance with the control signal formed by the forming means; and
    generating means for generating a driving signal for driving a subject which must be driven in accordance with the driving control data stored by the storing means and the control signal formed by the forming means.

2. A driving apparatus according to claim 1, wherein the generating means includes:
    latch means for latching the driving control data in accordance with the control signal formed by the forming means.

3. A driving apparatus according to claim 1, wherein the forming means includes:
    means having the start-bit detecting terminal and the data input terminal and arranged to disable detection of the start bit of the serial data input through the start bit driving terminal in a period in which the driving control data is stored in the storage region of the storage means through the data input terminal after the start bit has been detected from the serial data.

4. A driving apparatus comprising:
    detecting means for receiving serial data including information about the number of transmitted data items and driving control data, and detecting the information about the number of transmitted data items from the serial data;
    storing means for storing the driving control data in the storing region by the number corresponding to the information about the number of transmitted data items in response to the detected information about the number of transmitted data items; and
    generating means for generating a driving signal for driving a subject which must be driven in accordance with the driving control data stored in the storage means.

5. A driving apparatus comprising:
    forming means for receiving serial data including start bit, set data and driving control data, and detecting the start bit from the serial data so as to form a control signal;
    mode determining means for determining either of a setting mode for setting the operation for controlling driving of a subject which must be driven or a driving control mode for controlling driving of the subject which must be driven;
    storing means for setting the operation for controlling driving in accordance with the set data when the mode determining means has determined the setting mode; and
    generating means for receiving the driving control data when the mode determining means has determined the driving control mode so as to generate a driving signal for driving the subject which must be driven in accordance with the driving control data, the control signal formed by the forming means and the set operation set by the setting means.

6. A driving apparatus according to claim 5, further comprising:
    storage means for storing the driving control data of the serial data in a storage region;
    second setting means for receiving information about the number of data to be transmitted which is included in the set data of the serial data and setting the number of data to be transmitted in accordance with the information about the number of data to be transmitted; and
    second generating means for generating a data transmission enable signal for transmitting the driving control data to the storage region of the storage means in a quantity according to the number of data to be transmitted which has been determined by the second setting means.

7. A driving apparatus according to claim 5, wherein the mode determining means includes:
    means for detecting input of a reset signal from outside to determine a setting mode for setting the operation for controlling driving of the subject which must be driven so as to detect completion of setting of the operation performed by the setting means and control driving of the subject which must be driven.

8. A driving apparatus according to claim 5, wherein the mode determining means includes:
    means for determining the setting mode for setting the operation for controlling driving of the subject which must be driven when input of a reset signal from outside has been detected and determining a driving control mode for controlling driving of the subject which must be driven when transmission of a predetermined number of the set data to the setting means has been detected.

9. A driving apparatus according to claim 5, wherein the mode determining means includes:
means for determining the setting mode for setting the operation for controlling driving of the subject which must be driven when input of a reset signal from outside has been detected and determining a driving control mode for controlling driving of the subject which must be driven when the forming means has received the serial data having set data including information about the number of set data to be transmitted and completion of transmission of the set data corresponding to the information about the number of set data to be transmitted has been detected.

10. A driving apparatus according to claim 5, wherein the mode determining means includes:
means for detecting input of a reset signal from outside to determine the setting mode for setting the operation for controlling driving of the subject which must be driven and receiving a set completion signal output after completion of setting of the operation performed by the setting means so as to control driving of the subject which must be driven.

11. A driving apparatus comprising:
detecting means for receiving serial data including set data and driving control data, and detecting the set data from the serial data;
mode determining means for determining either of a setting mode for setting the operation for controlling driving of a subject which must be driven or a driving control mode for controlling driving of the subject which must be driven;
storing means for setting the operation for controlling driving in accordance with the set data when the mode determining means has determined the setting mode;
normal-completion determining means for determining whether or not the setting means has normally completed setting of the operation; and
generating means for receiving the driving control data when the mode determining means has determined the driving control mode and generating a driving signal for driving the subject which must be driven in accordance with the driving control data, and the set operation set by setting means.

12. A driving apparatus according to claim 11, wherein the normal-completion determining means includes:
means for determining whether or not the setting means has normally completed setting of the operation in accordance with a result of a calculation process of the set data received by the forming means.

13. A driving apparatus according to claim 11, wherein the normal-completion determining means includes:
means for determining whether or not the setting means has normally completed setting of the operation in accordance with whether or not a logical addition of the set data received by the forming means and check data of the set data is a predetermined value.

14. A driving apparatus according to claim 11, wherein the normal-completion determining means includes:
means for determining whether or not the setting means has normally completed setting of the operation in accordance with whether or not a predetermined number of the lower bit which is a result of a calculation of the logical addition of the set data received by the forming means and check data of the set data is a predetermined value.

15. A driving apparatus according to claim 11, wherein the mode determining means includes:
means for determining the setting mode for setting the operation for controlling driving of the subject which must be driven when the normal-completion determining means has determined that setting has not normally been completed and determining the driving control mode for controlling driving of the subject which must be driven when the normal-completion determining means has determined that setting has normally been completed.

16. A driving apparatus according to claim 11, wherein the mode determining means includes means for determining the driving control mode for controlling driving of the subject which must be driven when a setting completion signal has been detected which has been output when the normal-completion determining means has determined that setting has normally been completed.

17. A driving apparatus comprising:
forming means for receiving serial data having start bit including mode information, set data and driving control data, detecting the start bit from the serial data and forming a control signal;
mode determining means for determining either of a setting mode for setting the operation for controlling driving of a subject which must be driven or a driving control mode for controlling driving of the subject which must be driven in accordance with the mode information obtained owing to detection of the start bit performed by the forming means;
storing means for setting the operation for controlling driving in accordance with the set data when the mode determining means has determined the set mode; and
generating means for generating a driving signal for driving a subject which must be driven in accordance with the driving control data and the setting of the operation formed by the setting means.

18. A driving apparatus according to claim 17, wherein the made determining means includes means for forming an internal reset signal in accordance with the mode information detected by the forming means and determining a setting mode for setting the operation for controlling driving of a subject which must be driven in response to the internal reset signal.

19. A driving apparatus according to claim 17, wherein the mode determining means includes:
means for providing the mode information, permitting a determination to be made whether the mode is the set mode or the driving control mode, and switching between the setting mode and the driving control mode corresponding to the mode information, the mode information being provided following the start flag.

20. A driving apparatus according to claim 17, further comprising:
a set-data buffer for storing the set data received by the forming means in the setting means;
a driving data buffer for storing the driving control data received by the forming means in the generating means; and
means for detecting information about the number of transmissions included in the set data of the serial data when the mode determining means has determined the setting mode to set information about the number of transmissions to the set data buffer so as to store the driving control data into the driving data buffer in accordance with information about the number of transmissions.

21. A driving apparatus according to claim 17, further comprising:
    a set-data buffer for storing the set data received by the forming means in the setting means;
    a driving data buffer for storing the driving control data received by the forming means in the generating means; and
    transmission data selection means for transmitting, to the outside, the set data stored in the set data buffer through a data output terminal when the mode determining means has determined the setting mode and transmitting, to the outside, the driving data stored in the driving data buffer through the data output terminal when the driving control mode has been determined.

22. A driving apparatus system comprising:
    driving control apparatuses having forming means for receiving serial data including start bit and driving control data through a first input terminal and a second input terminal, outputting serial data to a serial data output terminal, detecting the start bit from the serial data and forming a control signal in accordance with the detected start bit; storing means for storing the driving control data in a storage region in accordance with the control signal formed by the forming means; and generating means for generating a driving signal for driving a subject which must be driven in accordance with the driving control data stored in the storing means and the control signal formed by the forming means, wherein the driving control apparatuses forming the plural stages and cascade-connected are structured such that:
    the driving control apparatus in the first stage has a data line arranged to transmit the serial data supplied from outside and connected to both of the first input terminal and the second input terminal, and
    the driving control apparatuses in the second and following stages have the data line, in parallel, connected to first input terminal, the serial data output terminal in the forward stage is connected to the second input terminal.

23. A driving apparatus system according to claim 22, further comprising:
    mode determining means for determining either of a setting mode for setting the operation for controlling driving of a subject which must be driven or a driving control mode for controlling driving of the subject which must be driven;
    means for detecting information about the number of data items of the driving control data to be transmitted from the serial data; and
    means for setting the information about the number of data items to be transmitted, when the mode determining means determines the setting mode, and transmitting the driving control data to the storage region corresponding to the information about the number of data items of the driving control data to be transmitted detected by the detecting means.

24. A driving apparatus system according to claim 22, further comprising:
    means for detecting information about the number of data items of the driving control data to be transmitted from the serial data; and
    means for transmitting the driving control data to the storage region corresponding to the information about the number of data items of the driving control data to be transmitted detected by the detecting means.

25. A driving apparatus system according to claim 22, further comprising:
    mode determining means for determining either of a setting mode for setting the operation for controlling driving of the subject which must be driven or a driving control mode for controlling driving of the subject which must be driven; and
    means for detecting information about the number of transmissions included in the set data of the serial data when the mode determining means has determined the setting mode to set the number of transmissions to the set data buffer so as to store the driving control data in the driving data buffer.

26. A driving apparatus system according to claim 22, further comprising:
    means for receiving serial data including start bit, driving control data and set data corresponding to a state of the cascade connection, setting the operation for controlling driving of the subject which must be driven in accordance with set data to correspond to the state of the cascade connection and generating a driving signal for driving the subject which must be driven in accordance with the driving control data and the control signal formed by the forming means to correspond to the set operation.

27. A driving apparatus system according to claim 22, further comprising:
    means for receiving serial data including start bit, driving control data and set data corresponding to the state of cascade connection and transmitting driving control data into the storing region in units of the product of the bit width of the storing region of the storing means and the number of the cascades in accordance with the set data.

28. A driving apparatus comprising:
    forming means for receiving serial data including start bit and driving control data, detecting the start bit from the serial data and forming a control signal in accordance with the detected start bit;
    storing means for storing the driving control data in a storing region in one of a first arrangement and a second arrangement different from the first arrangement selected by a selecting signal; and
    generating means for generating a driving signal for driving the subject which must be driven in accordance with the driving control data stored in the storing means and the control signal formed by the forming means.

29. A driving method comprising the steps of:
    a forming step for receiving serial data including start bit and driving control data, detecting the start bit from the serial data and forming a control signal in accordance with the detected start bit;
    a storing step for storing the driving control data in a storing region in response to the control signal formed in the forming step; and
    a generating step for generating a driving signal for driving the subject which must be driven in accordance with the driving control data stored in the storing step and the control signal formed in the forming step.

30. A driving method comprising the steps of:
    a detecting step for receiving serial data including information about the number of data items to be transmitted and driving control data, detecting the information about the number of data items to be transmitted from the serial data;

a storing step for storing the driving control data items in the storing region by the number corresponding to the information about the number of data items to be transmitted; and a generating step for generating a driving signal for driving the subject which must be driven in accordance with the driving control data stored in the storing step.

31. A driving method comprising the steps of:

a detecting step for receiving serial data including set data and driving control data, and detecting the set data from the serial data;

a mode determining step for determining either of a setting mode for setting the operation for controlling driving of a subject which must be driven or a driving control mode for controlling driving of the subject which must be driven;

a storing step for setting the operation for controlling driving in accordance with the set data when the setting mode has been determined in the mode determining step;

a normal-completion determining step for determining whether or not setting of the operation has been normally completed in the setting step; and a generating step for receiving the driving control data when the driving control mode has been determined in the mode determining step and generating a driving signal for driving the subject which must be driven in accordance with the driving control data, setting of the operation formed in the setting step.

32. A driving control method comprising the steps of:

a forming step for receiving serial data including a start bit having mode information, set data and driving control data, detecting the start bit from the serial data and forming a control signal in accordance with the start bit;

a mode determining step for determining either of a setting mode for setting the operation for controlling driving of a subject which must be driven or a driving control mode for controlling driving of the subject which must be driven in accordance with the mode information obtained by detecting the start bit in the forming step;

a setting step for setting the operation for controlling driving in accordance with the set data when the setting mode has been determined in the mode determining step; and a generating step for receiving the driving control data when the driving control mode has been determined in the mode determining step and generating a driving signal for driving the subject which must be driven in accordance with the driving control data and setting of the operation formed in the setting step.

33. A driving method comprising the steps of:

using a plurality of driving control apparatuses cascade-connected and incorporating a forming portion arranged to receive serial data including start bit and driving control data through a first input terminal and a second input terminal, output the serial data to a serial data output terminal, detect the start bit from the serial data and form a control signal in accordance with the detected start bit; a storing portion for storing the driving control data in a storing region in accordance with the control signal formed by the forming portion; and a generating portion for generating a driving signal for driving a subject which must be driven in accordance with the driving control data stored in the storing portion and the control signal formed by the forming portion such that the driving control apparatuses are cascade-connected;

a first connecting step in which the driving control apparatus at the first stage connects a data line for transmitting the serial data supplied from outside to both of the first input terminal and the second input terminal; and a second connecting step in which the driving control apparatuses in the second and following stages perform cascade connection such that the data line is connected to the first input terminal in parallel and the serial data output terminal in the previous stage to the second input terminal.

34. A driving method comprising the steps of:

a forming step for receiving serial data including start bit and driving control data, detecting the start bit from the serial data and forming a control signal in accordance with the detected start bit;

a storing means for storing the driving control data in a storing region in one of a first arrangement and a second arrangement different from the first arrangement selected by a selecting signal which is externally provided; and a generating step for generating a driving signal for driving a subject which must be driven in accordance with the driving control data stored in the storing step.

* * * * *